United States Patent [19]

Hoshimi et al.

[11] Patent Number: 4,817,159

[45] Date of Patent: Mar. 28, 1989

[54] METHOD AND APPARATUS FOR SPEECH RECOGNITION

[75] Inventors: Masakatsu Hoshimi, Kawasaki; Katsuyuki Niyada, Sagamihara, both of Japan

[73] Assignee: Matsushita Electric Industrial Co., LTD., Japan

[21] Appl. No.: 616,836

[22] Filed: Jun. 4, 1984

[30] Foreign Application Priority Data

Jun. 2, 1983 [JP] Japan ............................. 58-98350
Sep. 26, 1983 [JP] Japan ............................. 58-177318
Sep. 26, 1983 [JP] Japan ............................. 58-177319

[51] Int. Cl.$^4$ .............................................. G10L 5/00
[52] U.S. Cl. ................................................... 381/43
[58] Field of Search ..................................... 381/41–43; 364/513.5

[56] References Cited

U.S. PATENT DOCUMENTS

| | | | |
|---|---|---|---|
| 3,023,277 | 2/1962 | Mathews | 381/31 |
| 3,238,303 | 3/1966 | Dersch | 381/43 |
| 3,395,249 | 7/1968 | Clapper | 381/43 |
| 3,946,157 | 3/1976 | Dreyfus | 381/43 |
| 4,435,617 | 3/1984 | Griggs | 381/43 |

Primary Examiner—Emanuel S. Kemeny
Attorney, Agent, or Firm—Lowe, Price, LeBlanc, Becker & Shur

[57] ABSTRACT

Speech parameters ($P_h$ and $P_l$) are derived for consonant classification and recognition by separating a speech signal into Low and High frequency bands, then in each band obtaining the time first-derivative, from which the min-max differences (power dip) are obtained ($P_h$ and $P_l$). The distribution of $P_h$ and $P_l$ in a two-dimensional plot for a discriminant diagram classifies the consonant phoneme.

18 Claims, 21 Drawing Sheets

TO FIG. 6B

METHOD AND APPARATUS FOR SPEECH RECOGNITION

BACKGROUND OF THE INVENTION

This invention relates generally to method and apparatus for speech recognition, by detecting phonemes included in spoken words.

Various researches and developments take place recently for speech or vocal sound recognition, which is capable of handling a number of spoken words from many and unspecific persons. Speech recognition characterized by phoneme recognition is suitable for recognizing a number of words from unspecific persons because phoneme recognition is difficult to be influenced by the scattering among speakers, such as accent change. Furthermore, phoneme recognition is advantageous because a word dictionary is not required to have a large capacity since a speech signal is converted into a signal of less information in the form of phoneme strings, which signal corresponds to linguistics, and because the contents of the word dictionary can be readily produced and altered.

An important point, which must be considered when using such method of speech recognition, is to recognize phonemes correctly. Especially it is a difficult technical problem how to accurately effect the segmentation of an input audio signal for determining a consonant period and how to accurately recognize consonants. Various researches have been made hitherto for deriving a feature or peculiarity of a consonant or a group of consonants. However, only few conventional techniques can be found in connection with so called automatic recognizing technique in which segmentation is effected with respect to an input speech signal for determining the sort of phoneme.

Briefly describing a typical conventional technique involving segmentation for specifying phonemes, vocal sounds from a number of speakers (speaking persons) are analyzed by using a filter bank so as to obtain results of analysis for each frame period, such as 10 msec. As a result, spectrum information is obtained which is used for obtaining feature parameters in turn. By using the feature parameters standard patterns are produced for respective groups of 5 vowels and consonants in advance to be stored. Then segmentation of the vocal sound is effected by using the feature parameters which have been obtained. The result of segmentation is used to be compared with the standard patterns for determining or discriminating a phoneme. Finally, a time series of phonemes produced as a result is compared with the contents of the word dictionary, which are expressed in terms of time series of phonemes, so as to output a word corresponding to an item whose degree of similarity is the highest, as the result of recognition.

In the above, when the way of variation of full-range power is such that recesses or concave portions, which will be referred to as dips, exist in time-dependent varying state, a frame period in which the power level is minimal is expressed by a reference n1, and a frame period existing before or after the frame period n1, and showing negative or positive maximal value in the varying speed, which is referred to as power differential value, of the power level are expressed by references n2 and n3 respectively. Assuming that a differential value at a given frame period n is expressed by WD(n), when WD(n2) and WD(n3) satisfy the following relationships, a period from n2 to n3 is treated as a consonant period.

$$WD(n2) \leq -\theta_w$$

$$WD(n3) \leq \theta_w$$

wherein $\theta_w$ is a threshold for the prevention of addition of consonants where "addition" means erroneuos segmentation of a vowel period as a consonant period.

Then feature parameters indicative of features or pecuriarity of phonemes are obtained with respect to each consonant period to compare the same with standard patterns of respective phonemes, which have been provided in advance, for the classification of consonants with respect to each frame period. The result of such classification is then adapted to a consonant classification tree to classify consonants when conditions are coincided.

As described in the above, according to the conventional technique the power level of an input speech signal is obtained in connection with an entire frequency range thereof, and segmentation of each consonant included in each word is effected by using dips in the varying power level. Then classification of consonants is effected for each frame period, and finally the results of consonant classification are asigned to each portion of a consonant-classifying tree so as to effect classification of consonants. In this way the conventional technique requires a complex algorithm, while it is troublesome and time-consuming.

Furthermore, in the prior art since calculations for obtaining the degree of similarity are effected for respective frames included in an entire period determined by segmentation, the entire period is equally treated with an assumption that the entire consonant period is statical.

However, apart from vowels, the feature parameter of consonants and semivowels varies within its period as time goes where the varying state thereof shows the feature of each phoneme. Each portion having a feature, which may be referred to as a feature portion, varies throughout the sorts of consonants and semivowels. For instance, in voiced sounds and unvoiced plosive sounds features, which will be used for the determination or discrimination of the phoneme, are concentrated around the plosion; in nasal sounds features being consentrated at a transient portion to a following vowel; and in "r" sound and semivowels its features being represented by the variation of parameters throughout the entire period of the phoneme.

Therefore, the determination of consonants and semivowels may be effectively carried out by discriminating phonemes paying attention to the variation of parameters along time base in the feature portion with the feature portion for the discrimination of respective phonemes being extracted. In conventional techniques such processing is not involved.

SUMMARY OF THE INVENTION

The present invention has been developed in order to remove the above-described drawbacks inherent to the conventional method and apparatus for speech recognition.

It is, therefore, an object of the present invention to provide new and useful method and apparatus which is capable of readily effecting the segmentation of an input speech sound signal and recognition of consonants.

For achieving the above object in the present invention, low-frequency range power and high-frequency range power are used together as feature parameters, which will be used for effecting the segmentation and brief classification of consonants, such that segmentation and large-group classification are simultaneously effected by using the degree or magnitude of dips appearing in power level curve of the input speech sound signal. By "large-group classification" it is meant that each unknown consonant is classified into one of a plurality of groups of phonemes, including a group of voiced plosive sounds, a group of unvoiced plosive sounds, a group of nasal sounds, and a group of fricative sounds.

According to a feature of the present invention the power level of an input audio signal, which is an objective of sound recognition, is detected in connection with a low frequency range and a high frequency range, and the magnitude of each dip in two varying power levels of the low and high frequency ranges is detected for enabling application of 2-dimensional discriminant diagram, thereby segmentation and large-group classification of consonants are simultaneously effected.

After a consonant has been broadly classified into one of such groups, the consonant is further classified into one of subdivisions by the calculation of the degree of similarity between the feature parameter of the input speech sound signal and standard patterns, whose variation along time base has been taken into account, by using a statistical distance measure with the position of the power dip being set as a reference frame.

The features of the present invention are summarized as follows.

A: PRODUCTION OF PHONEME STANDARD PATTERN

Various phonemes constituting consonants are broadly classified into a plurality of groups of phonemes in accordance with the position of a feature portion of each phoneme. The plurality of groups includes a group of unvoiced plosive sounds /p/, /t/, /k/ and /c/; a group of voiced plosive sounds /b/ and /d/; a group of nasal sounds /m/ and /n/ where "r" sound /r/ and "ng" sound /ɔ/ extend over both the group of voiced plosive sounds and the group of nasal sounds, while a voiced fricative sound /z/ extends over both the group of voiced plosive sounds and the group of unvoiced fricative sounds.

Feature portions are respectively set to individual groups of phonemes, and a standard phoneme pattern is prepared in advance for each feature portion of each phoneme. The standard phoneme pattern is produced by using a number of data with the data being accurately labeled by visual seeing. Furthermore, another standard pattern of surrounding information of the feature portion is produced in advance with respect to respective phoneme groups in addition to the standard phoneme pattern.

B: DISCRIMINATION OF PHONEMES

Consonant segmentation of the input speech sound signal is effected to determine a consonant period. A portion of the determined consonant period, for instance an end point, is then regarded as a reference point, and a frame corresponding to this reference point is referred to as a reference frame. On the other hand, it is determined which phoneme group among the large-group classification, a phoneme of the consonant period belongs to. Then discrimination of the phoneme is effected with a standard pattern belonging to the determined phoneme group being applied to the feature portion in the consonant period.

The above discrimination is carried out in the following manner since automatic and accurate finding of a feature portion is generally difficult. Therefore, a proposed period for a feature portion is obtained with some flexibility, and then the degree of similarity to respective phonemes is calculated by applying the standard patterns to the entire range of the proposed period. On the calculation for the degree of similarity, the degree of similarity to the standard pattern of the peripheral information of the phoneme groups, which have been described in the above A, is removed by using the degree of similarity between the phoneme standard pattern and unknown input. With this operation it is possible to remove infornmation of a portion which does not correspond to the feature portion, i.e. portion corresponding to the periphery of the feature portion, among the proposed period for the feature portion. As a result, phoneme discrimination is carried out with the feature portion being accurately captured.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

The concept of the present invention will be first described for a better understanding the embodiments thereof.

1. PREPARATION OF STANDARD PATTERN AND DISCRIMINANT DIAGRAM

Preparation or production of standard patterns, which will be used in the present invention, will be described since consonants constituting a spoken word are determined by using standard patterns or discriminant diagrams. As will be described in detail hereinafter, four different sorts of standard patterns are prepared. In detail, a first set of standard patterns or a discriminant diagram is used for effecting segmentation of the input speech sound signal and for effecting large-group calassification of phonemes, and a second set of standard patterns is used for effecting small-group classification of phonemes after the large-group classification. In addition, a third set of standard patterns is used for detecting nasal sounds, and a fourth set of standard patterns being used for the distinguishment between voiced sounds and unvoiced sounds.

(1) STANDARD PATTERN FOR EFFECTING SEGMENTATION AND LARGE-GROUP CLASSIFICATION

According to the present invention the input voice-frequency sound signal is processed to obtain feature parameters in connection with a low-frequency range and a high-frequency range respectively. Such two frequency bands are used since features of voiced sounds are apt appear in the high-frequency range, while features of unvoiced sounds are apt to apear in the low-frequency range.

The power levels at both the low and high frequency ranges are obtained for respective frame periods, for instance 10 msec for each frame period. The input voice signal is applied to a low-frequency band pass filter, whose pass band is 250–600 Hz, and a high-frequency band pass filter, whose pass band is 1,500–4,000 Hz, for obtaining logarithm of power in each frequency bands, and then the obtained logarithm is smoothed to obtain the power levels.

Figure 1:
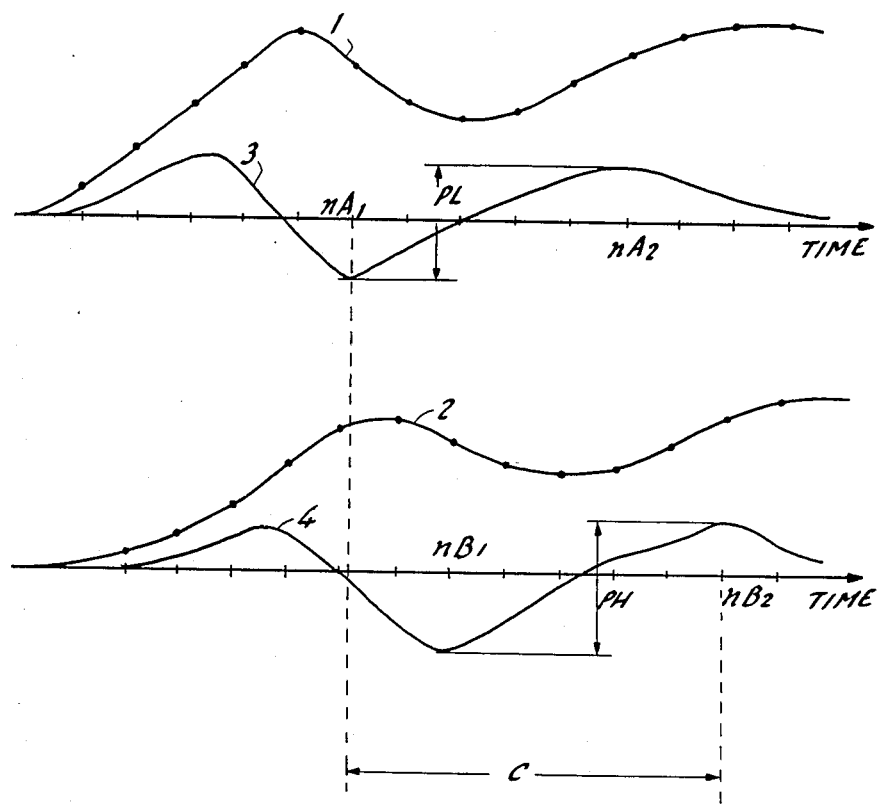
FIG. 1 is an explanatory diagram showing the way of detecting dips in low-frequency range power level variation and in high-frequency range power level variation.
Figure 2:
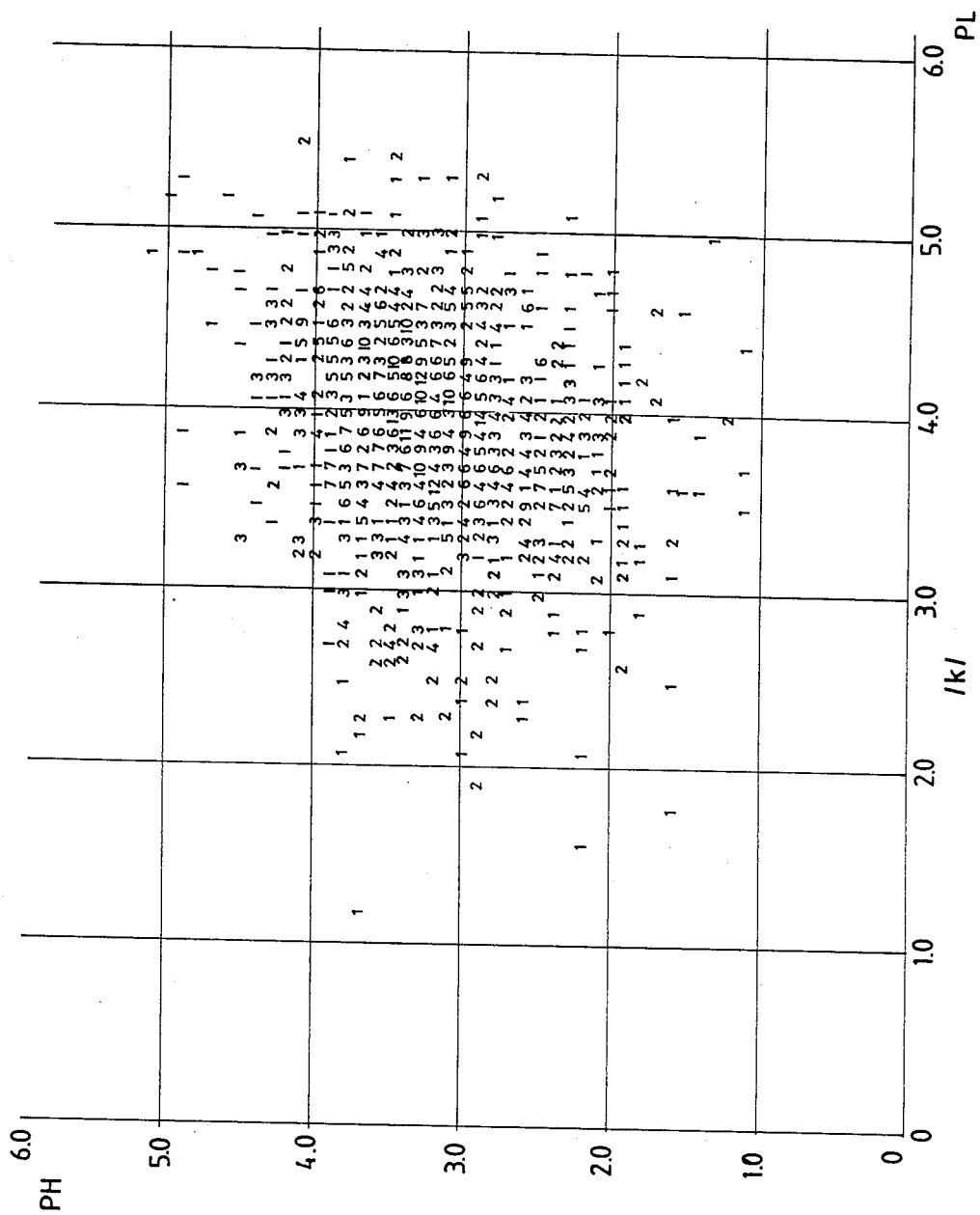
FIGS. 2 to 5 are diagrams showing distribution of the degrees of dips in low-frequency range power level variation and in high-frequency range power level variation in connection with respective phonemes.
Figure 3:
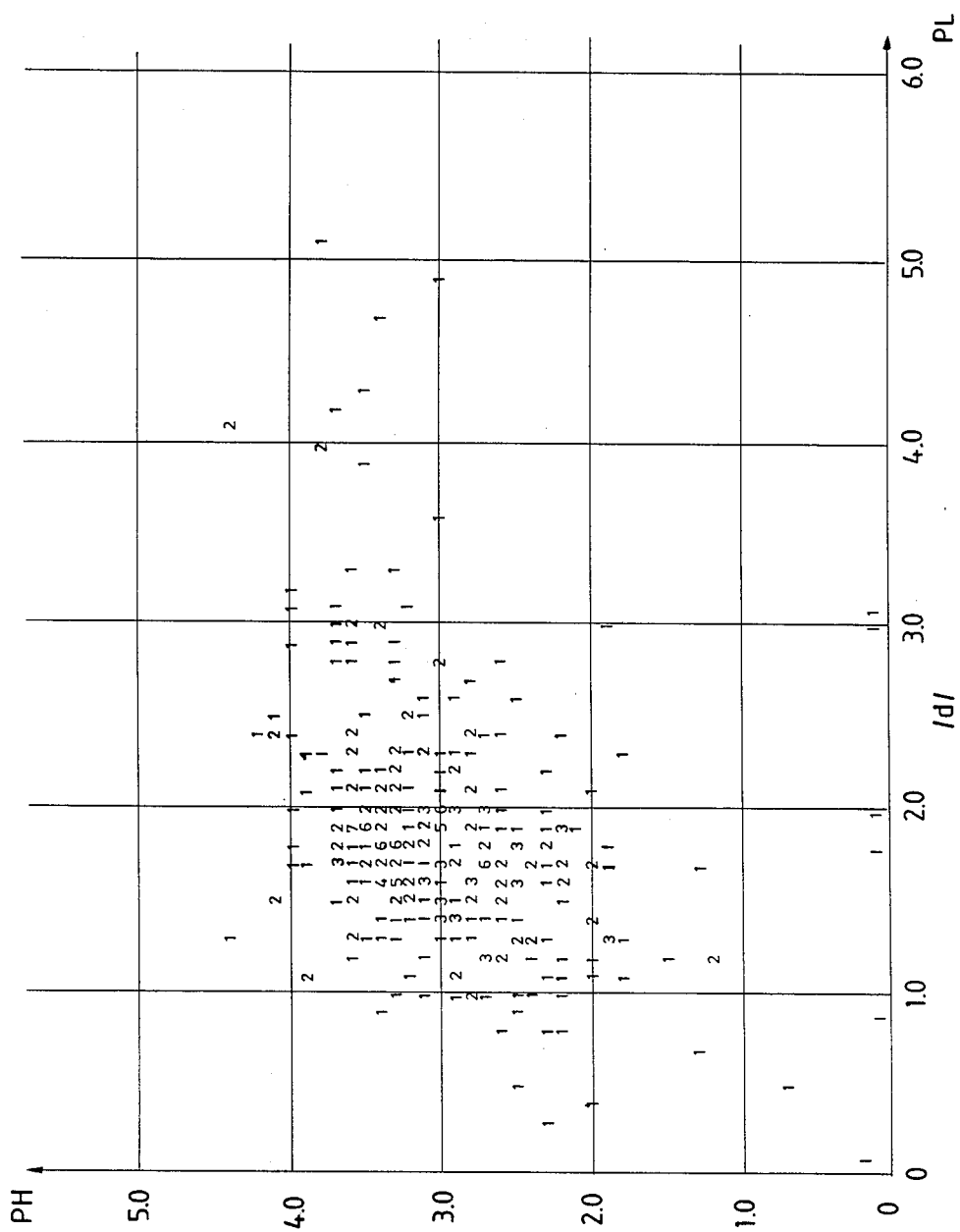

Now the way of obtaining the magnitude of each power dip will be described with reference to FIG. 1. Curves 1 and 2 respectively show the state of varying power level at the low-frequency range and the high-frequency range with respect to time. Curves 3 and 4 respectively show the state of varying difference values derived from the variation of the power levels 1 and 2 with respect to time. In the above, "difference value" means a differential value which may be obtained by detecting the difference between two power levels at a predetermined time interval. Frame periods in which the difference value at the low-frequency range respectively assumes negative and positive maximal values are denoted by references nA1 and nA2. Similarly frame periods in which the difference value at the high-frequency range assumes negative and positive maximal values are denoted by references nB1 and nB2. The difference values in respective frame periods are denoted by references WDL(nA1), WDL(nA2), WDH(nB1), and WDH(nB2).

The maximal and minimal value points in the difference value curve are considered as power dips, and the magnitude of each dip is defined by:

$$PL = WDL(nA2) - WDL(nA1)$$

$$PH = WDH(nB2) - WDH(nB1)$$

wherein PL is the magnitude of a power dip in the low-frequency range, and PH is the magnitude of a power dip in the high-frequency range.

A consonant period, for which a single consonant is detected, is determined in the following manner. When a dip period in the curve 1 of the low-frequency range does not overlap with a dip period in the curve 2 of the high-frequency range, these dip periods are respectively used as consonant periods. In the above, the words "dip period" is used to mean a period of time between a mimimal value point and a subsequently coming maximal value point in either the curve 3 or 4 of the low or high frequency range. In the case that such dip period of the curves 3 and 4 of the low and high frequency ranges are overlapped either partially or entirely, the consonant period is determined by a period between a minimal value point of one curve 3 or 4 and a subsequently coming maximal value point of the other curve 4 or 3. In the case of FIG. 1, a period of time from the frame period nA1 and the frame period nB2 is used as the consonant period C. The magnitude of the power dip of each of the curves 1 and 2 of the low and high frequency ranges within the consonant period C is indicated by PL and PH respectively.

Figure 4:
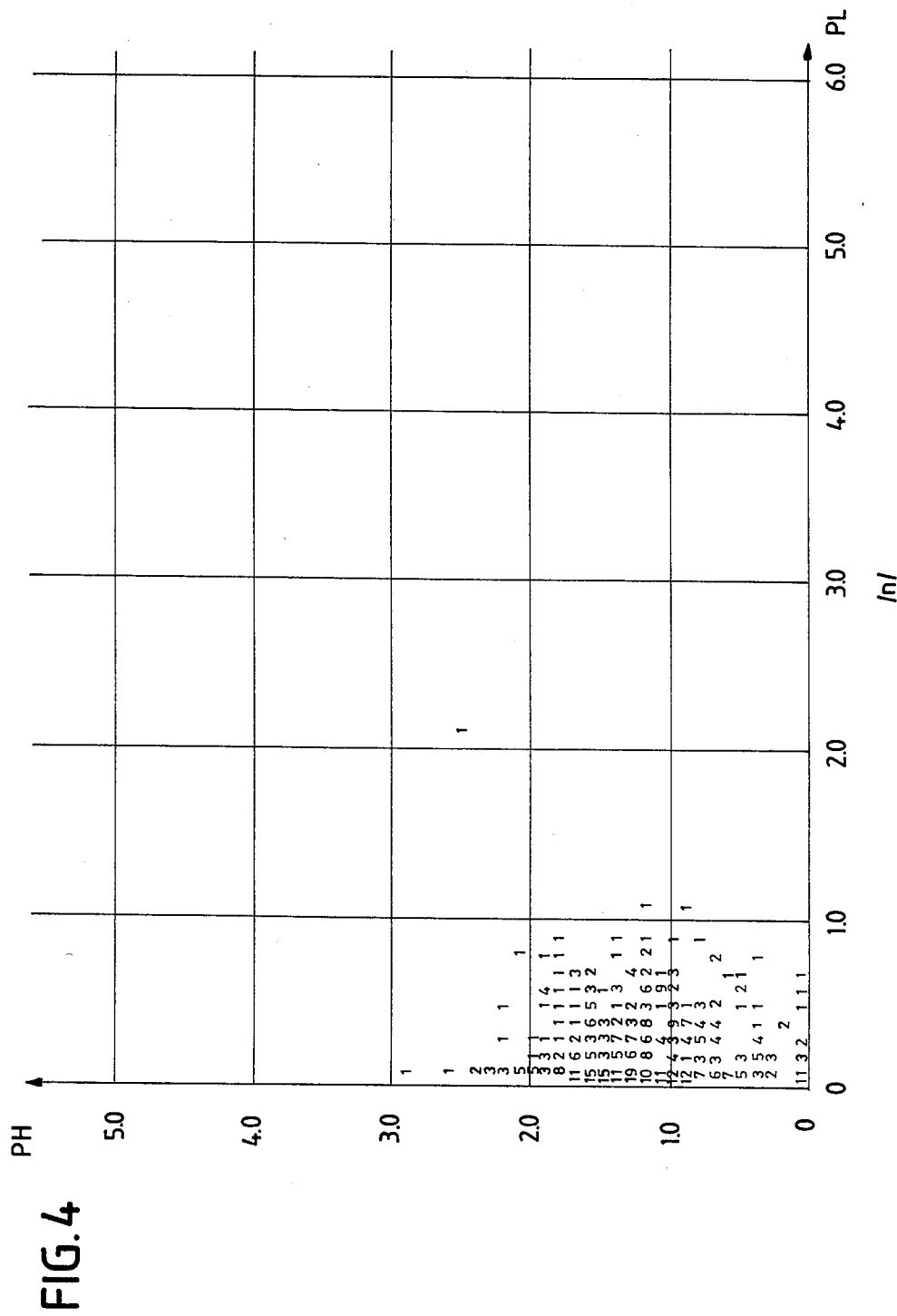
Figure 5:
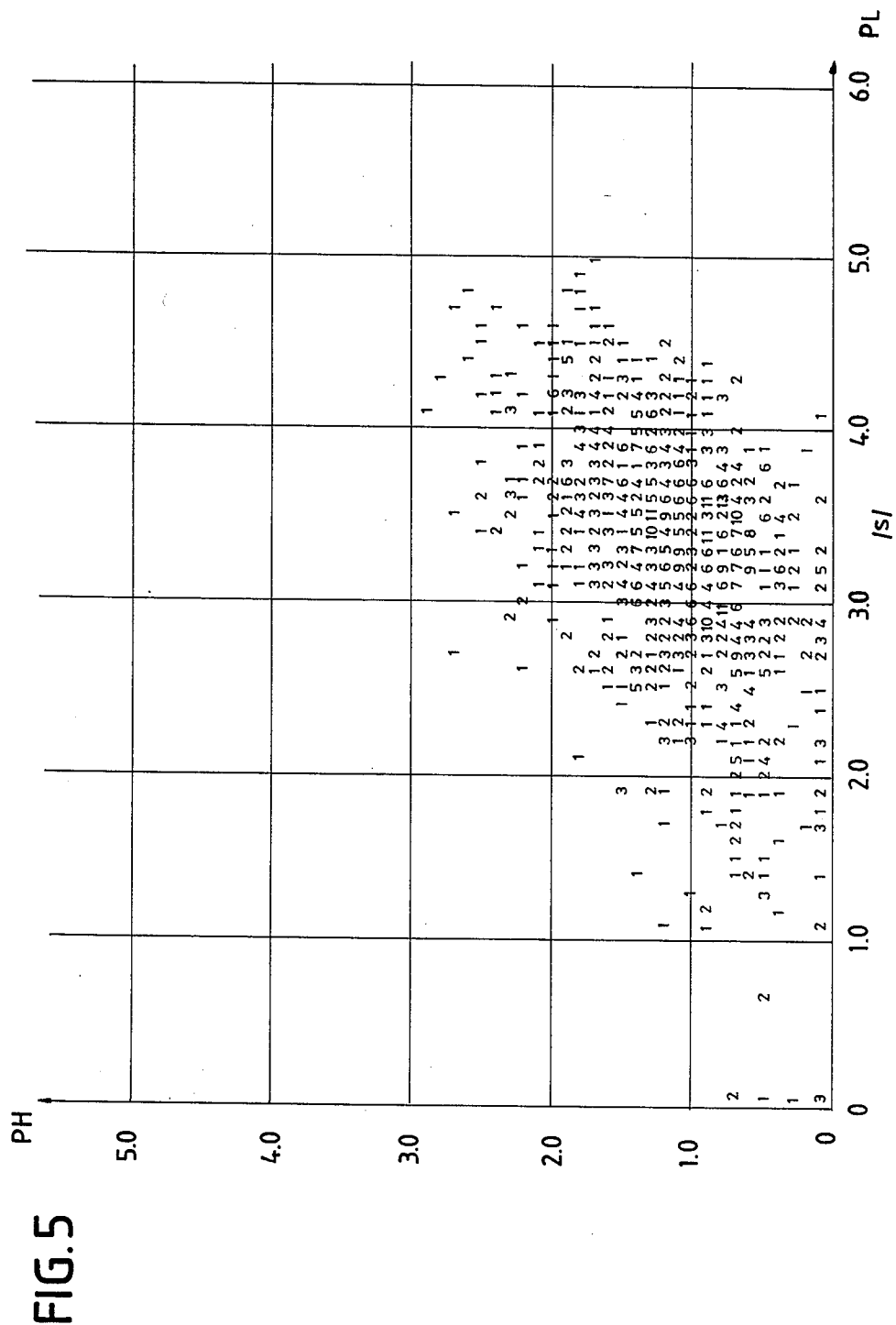

The magnitudes PL and PH of power dips in both the low and high frequency ranges will be used for the classification of consonants as follows. Applicants have found that the relationship between the values PL and PH varies throughout various consonant phonemes. In order to make clear this point reference is now made to FIGS. 2 through 5 which are 2-dimensional graphical representation showing the relationship between PL and PH with respect to phonemes /k/, /d/, /n/ and /s/ respectively. In these graphs, the values of PL are plotted along X-distance, while the values of PH are plotted along Y-distance. Numerals shown in the graphs indicate the number of detections of a particular phoneme, such as /k/ in FIG. 4, resulted from speech analysis effected for a number of speakers. Namely, the numerals indicate the frequency of detections. As clearly seen in these graphs, phonemes of plosive sounds, such as /k/ and /d/ have a characteristic that the values of both PL and PH are large, and especially in the case of the phoneme of unvoiced plosive sound /k/, the value of PL is very large, while in the case of the phoneme of voiced plosive sound /d/, the value of PH is very large. In the case of a phoneme of non-plosive sound /n/, the values of PL and PH are both small, while in the case of another phoneme of non-plosive sound /s/ the value of PL is large and the value of PH is small. This difference between these non-plosive sounds can be distinguished from another as shown in FIGS. 4 and 5 because /n/ is a unvoiced sound consonant, whereas /s/ is a voiced sound consonant.

As described in the above by using both low-frequency range power and high frequency range power distinguishment between voiced consonants and unvoiced consonants can be effected. Furthermore, by detecting the magnitude of power dip, plosive sounds can be detected.

Since the relationship between the values PL and PH exhibits a given tendency depending on the sort of the consonant, unknown consonants can be broadly classified into four groups of unvoiced plosive sounds /p/, /t/, /k/, and /c/; voiced plosive sounds /b/ and /d/; nasal sounds m/ and /n/; and unvoiced fricative sounds /s/ and /h/ by using a standard pattern or a 2-dimensional discriminant diagram which may be used for the large-group classification of phonemes.

In the case that the value of both PL and PH are small, such a phoneme is not detected as a consonant since the dip is considered to be appeared in a vowel or a semivowel (such a dip being referred to as an added dip). From the above it will be understood that large-group classification of consonants and segmentation are simultaneously effected according to the present invention.

Figure 6A:
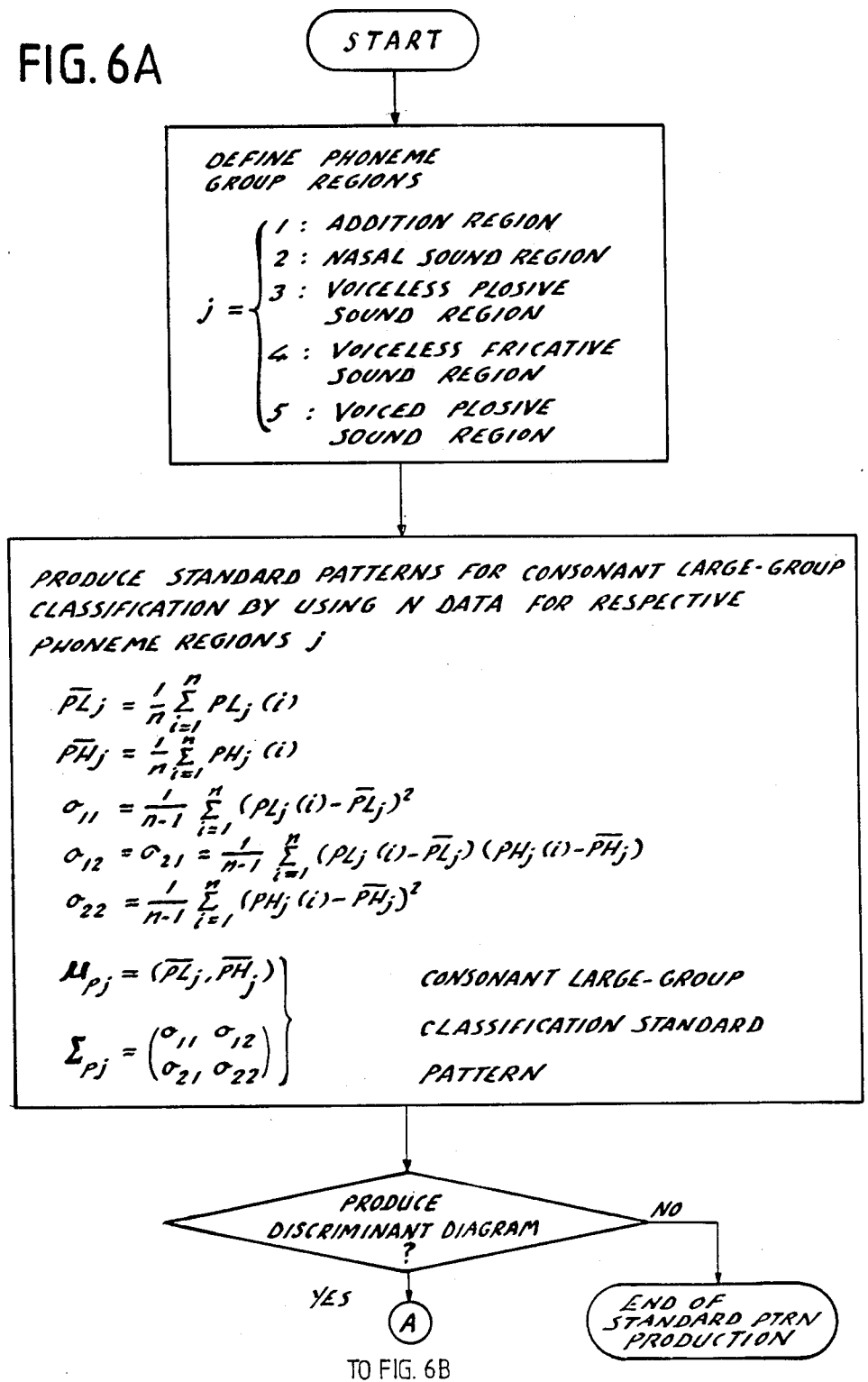
FIG. 6 is a flowchart showing the operation of a computer used for producing large-group classfication discriminant diagram and standard patterns.
Figure 6B:
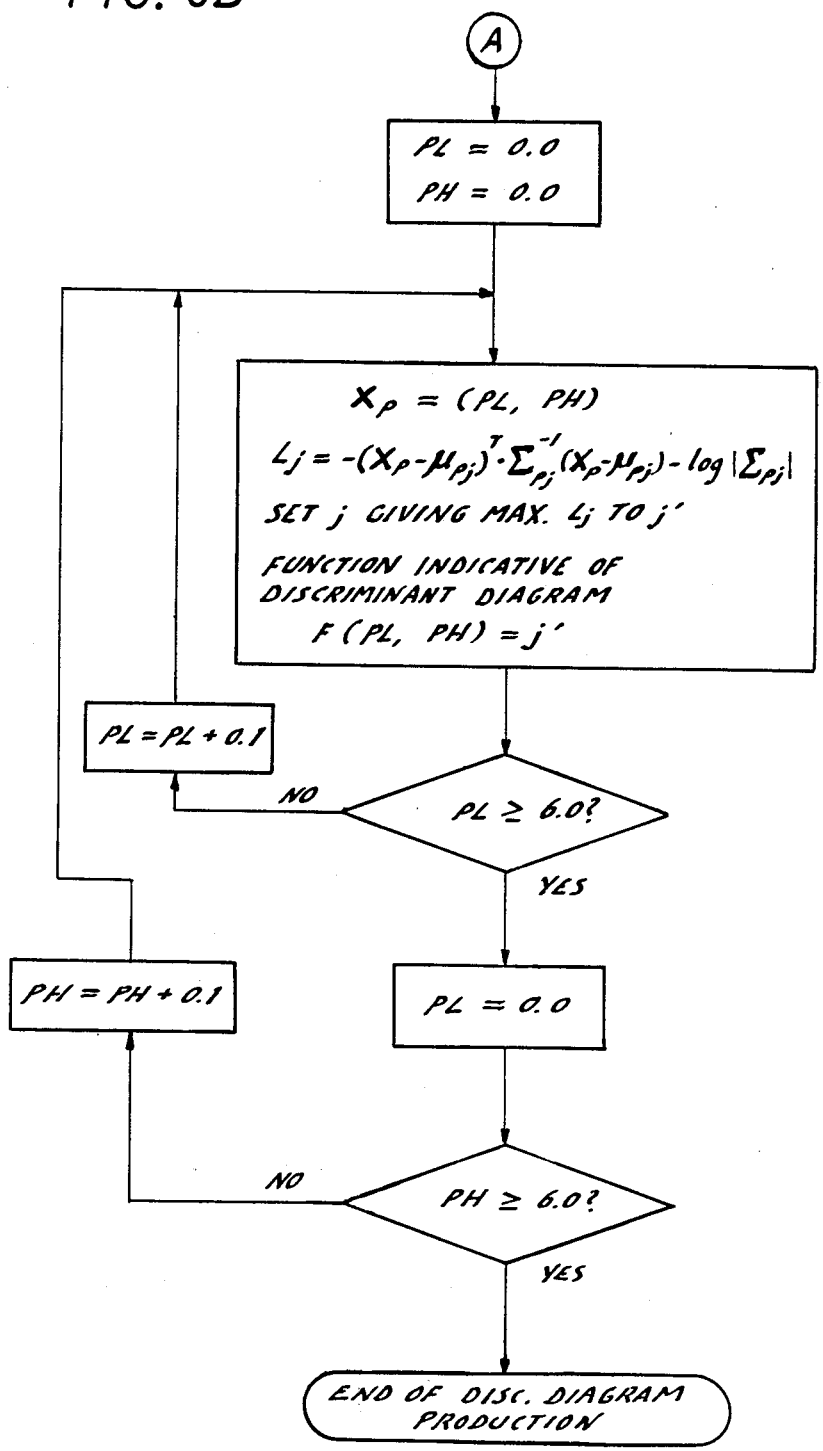

The above-described preparation of the standard pattern and the discriminant diagram for the large-group classification of consonants will be described with reference to a flowchart of FIG. 6. In order to produce the standard pattern, groups of phonemes are determined by eye measurement of spectrum patterns in advance, and data obtainined in this way is used so as to obtain the values of PL and PH for each data. In FIG. 6, it is defined that regions where j=1 is an addition region, where j=2 is a nasal sound regions, where j=3 is a unvoiced plosive sound region, where j=4 is a unvoiced fricative sound region, and where j=5 is a voiced plosive sound region. Then an average value and variance-covariance matrix are obtained by using the following formulas in connection with phoneme groups or addition extracted from the standard pattern producing data.

$$\overline{PL_j} = \frac{1}{n} \sum_{i=1}^{n} PL_j(i)$$

$$\overline{PH_j} = \frac{1}{n} \sum_{i=1}^{n} PH_j(i)$$

$$\sigma_{11} = \frac{1}{n-1} \sum_{i=1}^{n} (PL_j(i) - \overline{PL_j})^2$$

$$\sigma_{12} = \sigma_{21} = \frac{1}{n-1} \sum_{i=1}^{n} (PL_j(i) - \overline{PL_j})(PH_j(i) - \overline{PH_j})$$

$$\sigma_{22} = \frac{1}{n-1} \sum_{i=1}^{n} (PH_j(i) - \overline{PH_j})^2$$

$$\left. \begin{array}{l} \mu_{pj} = (\overline{PL_j}, \overline{PH_j}) \\ \Sigma_{pj} = \begin{pmatrix} \sigma_{11} & \sigma_{12} \\ \sigma_{21} & \sigma_{22} \end{pmatrix} \end{array} \right\} \text{consonant large-group classification standard pattern}$$

While it is possible to effect segmentation and classification of phoneme groups with the above standard patterns being directly applied to unknown inut data, another way may also be possible in which a discriminant diagram is prepared in advance so that application of the standard pattern may be avoided. In actual practice, the latter has an advantage in view of amount of calculations. The way of producing such a discriminant diagram will be described. The discriminant diagram is produced with a step of 0.1 dB within a range expressed in terms of 0 dB≦PL≦6.0 dB and 0 dB≦PH≦6.0 dB by using the distribution of dips of respective phonemes. Points in a two-dimensional coordinate expressed in terms of Xp=(PL,PH) are considered as input data, and then the distance between each point and each of respective standard patterns corresponding to j=1 to 5, is calculated in accordance with the following formula. After the calculation, the value of j which gives the highest degree of similarity, i.e the largest value of Lj, is considered as the value at (PL, PH).

$$L_j = -(X_p - \mu_{pj})^T \cdot \Sigma_{pj}^{-1} (X_p - \mu_{pj}) - \log |\Sigma_{pj}|$$

Figure 7:
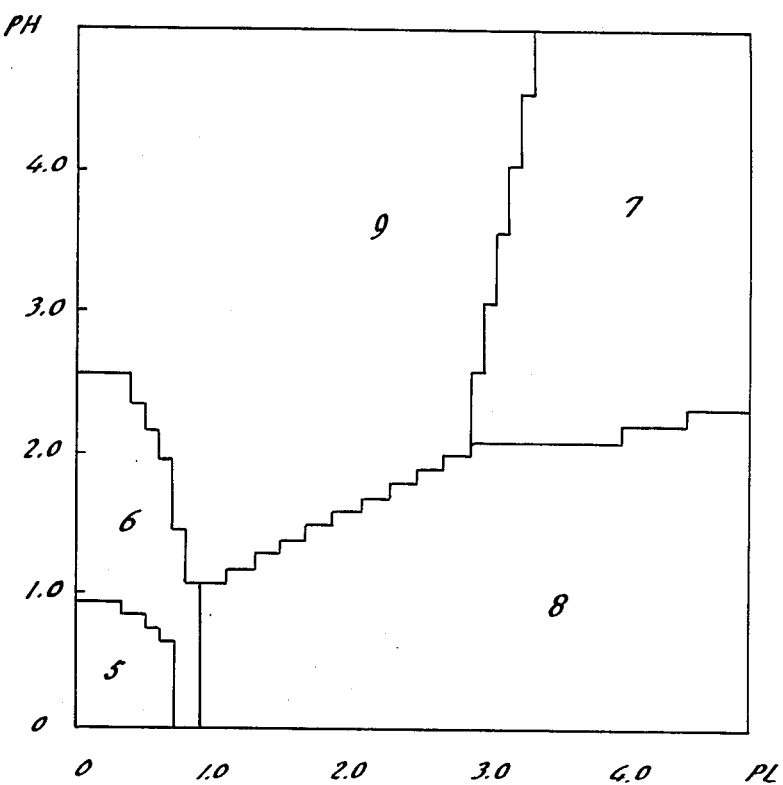
FIG. 7 is a discriminant diagram in one embodiment of the present invention.

Such processing is effected in connection with respective points within an area defined by 0≦PL≦6.0 and 0≦PH≦6.0, so as to produce a discriminant diagram shown in FIG. 7. This discriminant diagram is defined by a function expressed in terms of F(PL, PH), which includes a standard pattern number j corresponding to respective coordinate points (PL, PH).

In the 2-dimensional discriminant diagram of FIG. 7 prepared by using a number of data obtained through speech analysis, the entire square region is divided into five regions. A region 5 is for the addition region described by F(PL, PH)=1; a region 6 being for nasal sounds (/m/ and /n/) described by F(PL, PH)=2; a region 7 being for voiced plosive sounds (/b/ and /d/) described by F(PL, PH)=3, a region 8 being for voiceless fricative sounds (/s/ and /h/) described by F(PL, PH)=4; and a region 9 being for unvoiced plosive sounds (/p/, /t/, /k/, and /c/) described by F(PL, PH)=5. The addition region 5 is used for prohibiting segmmentation as a consonant period since a sound in this region 5 is considered to be produced such that a vowel is added to a consonant.

(2) STANDARD PATTERN USED FOR EFFECTING PHONEME SMALL-GROUP CLASSIFICATION

Now the way of producing standard patterns used for classifying phonemes, which have been broadly classified into large phoneme groups, into small groups correspending to individual phonemes by way of pattern-matching, will be described.

Since unvoiced plosive sounds and voiced plosive sounds have features or characteristics at a transient portion bridging from a plosive point to a subsequent vowel, it is necessary to calculate the degree of similarity with the change around the plosive point being considered, for classifying into small groups within the group of unvoiced plosive sounds or the group of voiced plosive sounds. Nasal sounds have features at a transient portion to a vowel, and therefore it is necessary to effect calculation of similarity at such a portion. An "r" sound /r/ has features in the variation in the spectrum throughout its entire period and in lasting time. A "Z" sound /z/ has a feature in its buzz portion and in a subsequent fricative portion.

Although feature portions of respective consonant groups are different from each other, it is common to all that variation along time base around a feature point is important information. Therefore, standard patterns used for effecting small-group classification are produced by using data of a plurality of frames so that variation along time base can be expressed.

The way of producing the standard patterns will be described. The standard patterns are produced by using a large number of the above-mentioned standard pattern producing data, which are obtained by accurately separating each consonant included in a speech by the eye-measurement.

A reference frame which will be used as a reference, is determined for each phoneme. The reference frame is selected in such a manner that a plosive point frame is selected in the case of a plosive sound, and a frame where spectrum variation is the maximum is selected in the case of other consonants. Phoneme standard patterns are produced such that one standard pattern corresponds to one phoneme, by using a number of data, i.e. standard pattern producing data, within the same phoneme group. More specifically, data from a plurality of frames whose number is expressed by $l = l_1 + l_2 + 1$ (wherein $l_1$ is the number of frames positioned before the reference frame, and $l_2$ is the number of frames positioned after the reference frame), is obtained so as to form d.l-dimensional vector. And then average value and variance-covariance matrix are obtained in the same manner as described in the above (1) with reference to FIG. 6.

an average $\mu =$ $$(\mu_1^1, \mu_2^1, \ldots \mu_d^1, \mu_1^2, \mu_2^2 \ldots \mu_d^2, \ldots \mu_1^l, \mu_2^l \ldots \mu_d^l)$$

wherein $\mu_i^{l'} = \frac{1}{N} \sum_{n=1}^{N} X_i^{l'}$ ($l' = 1$ to $l$, $i = 1$ to $d$)

In the above, X is a feature parameter, which is indicated at an LPC cepstrum coefficient in the embodiment of the present invention, LPC cepstrum coefficient being described hereinlater; N is the number of samples; and d is the number of feature parameters per one frame. The variance-covariance is a d.l-dimensional matrix, and its elements are given by:

$$\sigma_{i,j} = \frac{1}{N-1} \sum_{n=1}^{N} (X_i - \mu_i)(X_j - \mu_j)$$

wherein $i = 1, 2 \ldots dl$
$j = 1, 2 \ldots dl$

In a standard pattern of a phoneme i, an average value is expressed by $\mu_i$, while variance-covariance matrix is expressed by $\epsilon_i$.

Another standard patterns, which are referred to as surrounding information standard patterns, are produced in the following manner. The words, surrounding information, are used to mean information around the reference frame. The surrounding information standard patterns are produced such that one sort of surrounding information standard pattern is produced for each phoneme groups because surrounding information is common to respective phonemes within the same phoneme group. For instance, in the voiced plosive sound group (/b/, /d/), there necessarily exists several frames of buzz portion before its feature portion, i.e. plosive portion, and the plosive portion is followed by a vowel. Because of such regularity, it is possible to produce the surrounding information standard patterns respectively corresponding to respective phoneme groups.

Figure 8:
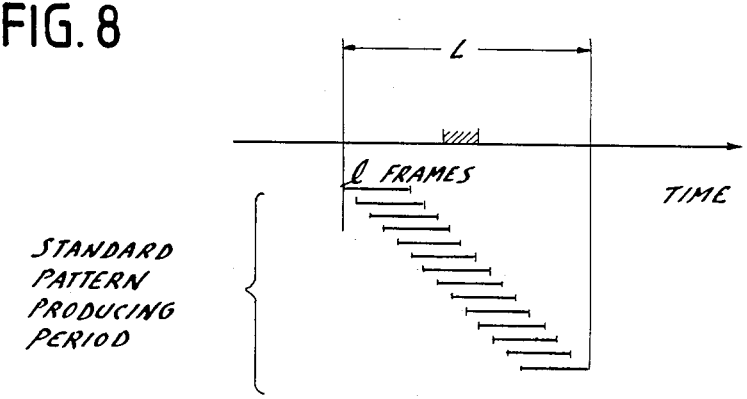
FIG. 8 is an explanatory diagram showing the way of producing surrounding information standard patterns in one embodiment of the present invention.

FIG. 8 shows the way of producing the surrounding information standard patterns. A feature portion, such as the above-described plosive portion in the case of a plosive sound, is indicated by a hathed portion. A time length L, which is sufficiently longer than the time length of the feature portion, is determined as a surrounding information period. As shown in FIG. 8, feature parameters of frames of dx th dimension are derived throughout the entire period L with the frames being shifted one by one. This processing is applied to many data belonging to the same phoneme group for obtaining an average vector and variance-covariance matrix which are used as the surrounding information standard pattern. Thus, although each surrounding information standard pattern includes data of the feature portion, the weight of data around the feature portion is greately large. The above-mentioned average vector and the variance-covariance matrix are respectively expressed in terms of $\mu_e$ and $\epsilon_e$.

(3) STANDARD PATTERNS FOR DETECTING NASAL SOUND AND FOR DISCRIMINATING VOICED OR UNVOICED SOUND

Six standard patterns are produced by using the standard pattern producing data where the six standard patterns are for five vowels (/a/, /i/, /u/, /e/, /o/), and for nasal sounds (/m/, /n/ and the syllabic nasal in Japanese). These six standard patterns are used for the detection of nasal sounds.

In addition a standard pattern for discrimating voiced or unvoiced sound is produced. This standard pattern is produced by using all frames showing voiced and unvoiced sounds. An average value and variance-covariance matrix of the standard pattern for detecting nasal sound are expressed by $\mu^N$ and $\epsilon^N$, and a standard pattern for discriminating voiced or unvoiced sound is expressed by $\mu^V$ and $\epsilon^V$.

2. DISCRIMINATION OF PHONEME

Now it will be described how to determine unknown consonants included in an iuput speech. The determination is peformed by discriminating each phoneme by using the above-described various standard patterns which have been obtained by the method described in the above.

Figure 9:
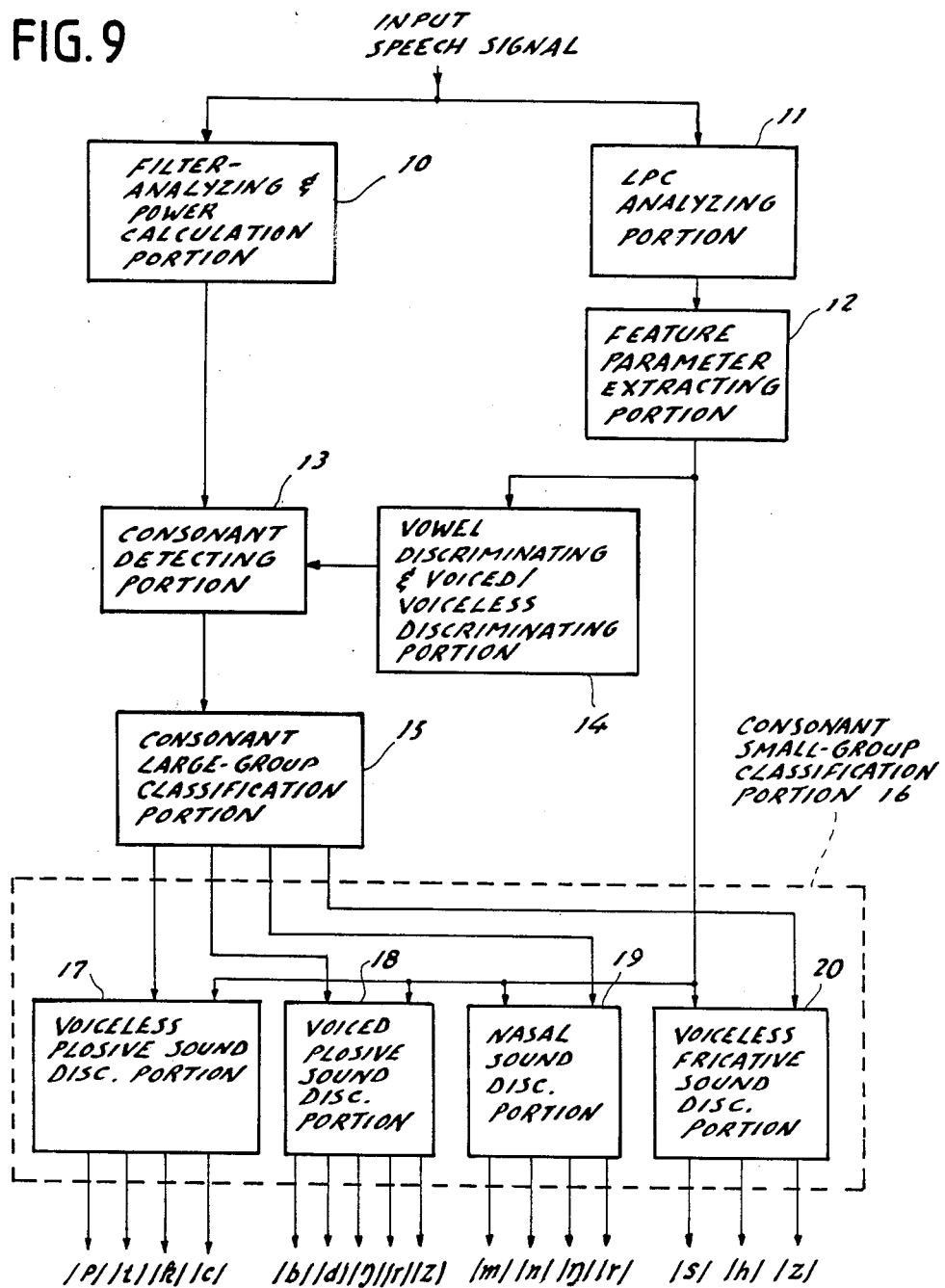
FIG. 9 is a block diagram for the description of the way of phoneme recognition in one embodiment of the present invention.

FIG. 9 is a diagram for the description of the way of recognition of consonants. An input audio signal representing spoken words is inputted into a filter analyzing and power calculation portion 10, and to an LPC (linear prediction coding) analyzing portion 11. The filter analyzing and power caluculation portion 10 analyzes the frequency of the input audio signal by way of two-channel band pass filter having a low-frequency range and a high-frequency range. More specifically, power (band power) is calculated for each frame (10 msec) with respect to each channel. The passband of the low pass filter approximately ranges from 250 Hz to 600 Hz, whereas the passband of the high pass filter approximately ranges from 500 Hz to 4000 Hz. The band power data obtained in this way will be used for detecting consonants and for discriminating consonant period as already described in the above 1(1).

The LPC analyzing portion 11 effects LPC analysis, i.e linear prediction analysis, for each frame of the input audio signal. The degree of LPC analysis is 15th or so. A feature parameter extracting portion 12 is responsive to results from the LPC analyzing portion 12 so as to calculate LPC cepstrum coefficient which is a parameter indicative of a brief shape of frequency spectrum. LPC cepstrum coefficient is a parameter which is useful for phoneme recognition directed to unspecific speaking persons as described in "EVALUATION OF FEATURE PARAMETERS AND DISTANCE MEASURE FOR SPEAKER INDEPENDENT PHO- NEME RECOGNITION" by Niyada et al. (Publication of Institute of Acoustics, October 1982).

A vowel discriminating and voiced or unvoiced sound discriminating portion 14 is responsive to feature parameters from the feature parameter extracting portion 12 so as to calculate, for each frame, the degree of similarity between the feature parameters and the standard pattern, i.e. the above-mentioned nasal sound detecting standard pattern, of vowel and nasal sounds (which is a group of /m/, /n/ and the syllabic nasal in Japanese). As a result of similarity calculation, a phoneme whose degree of similarity is the highest is determined as the result of vowel and nasal sound discrimination for the frame. Similarly, the degree of similarity in connection with the standard pattern of voiced and unvoiced sounds, i.e the above-mentioned voiced and unvoiced sound detecting standard pattern, is calculated so as to output the result of voiced or unvoiced sound discrimination for each frame.

As distance measures used for calculating the degree of similarity the following statistical distance measures may be effectively used.

When
input feature parameter: $X = (X1, X2 \ldots Xd)$
standard pattern: average value $\mu^N = (\mu1, \mu2 \ldots \mu d)$
variance-covariance matrix $$\Sigma_i^N = \begin{pmatrix} 6_{11}, & 6_{12} & \ldots & 6_{1,d} \\ 6_{21} & & & \\ \cdot & & & \\ \cdot & & & \\ \cdot & & & \\ 6_{21} & \ldots & \ldots & 6_{d,d} \end{pmatrix}$$

wherein d is the dimensional number, then a distance to a phoneme i is defined as follows:

Distance based on Bayes' discriminant:

$$Pi = \frac{1}{(2\pi)^{\frac{d}{2}} \cdot |\Sigma_i|^{\frac{1}{2}}} \{\exp - \frac{1}{2}(X - \mu_i^N)^T \cdot \Sigma_i^{-1} \cdot (X - \mu_i^N)\} \quad (1)$$

Mahalanobis' distance:

$$Li = (X - \mu_i^N)^T \cdot \Sigma_i^{-1} \cdot (X - \mu_i^N) \quad (2)$$

In the above the superscript $-1$ indicates an inverse matrix, and another superscript T indicates transposition, while $\epsilon^N$ is written as $\epsilon_i$ for simplicity.

A phoneme, which makes Pi of Eq. (1) maximum, or a phoneme, which makes Li of Eq. (2) minimum, is determined as the result of discrimination for the frame. Voiced or unvoiced sound discrimination is effected in the same manner with $\mu^V$ and $\epsilon^V$ being used in place of $\mu^N_i$ and $\epsilon^N_i$. Substantially the same results are obtained from Eqs. (1) and (2). Furthermore, a linear discriminant function may also be used as a statistical distance measure.

A consonant detecting portion 13 of FIG. 9 effects segmentation as a consonant period when n or more frames, for instance, 4 frames, which are determined as nasal sound or unvoiced sound, continuously appear.

The consonant detecting portion 13 also obtains low-frequency range power WL(I) and high-frequency range power WH(I) by using output from the filter analyzing and power calculation portion 10 in the same manner as the above-described 1(1). Then difference values WDL(I) and WDH(I) of the power values are obtained. In the above I is used to indicate a frame number, which assumes a value variable from IS representing a sound-beginning frame of an input speech sound to IE representing a sound-ending frame of the same as expressed by $IS \leq I \leq IE$.

Then a frame where WDL(I) assumes minimal is obtained as I=nA1, and a frame where WDL(I) assumes maximal after the minimal is obtained as I=nA2. This is done in connection with WDH(I) so as to obtain nB1 and nB2. When a period defined between nA1 and nA2 and another period defined between between nB1 and nB2 overlap each other, a new period is determined such that its beginning corresponds to a point defined by a smaller value between nA1 and nB1, and its ending corresponds to a point defined by a larger value between nA2 and nB2. This new period is used as a proposed consonant period. In the case that the period nA1 to nA2 does not overlap the period nB1 to nB2, each of these periods are used as a proposed consonant period.

A consonant large-group classification portion 15 is responsive to output from the consonant detecting portion 3 for producing PL and PH indicative of the magnitude of power dips with respect to each proposed consonant period as:

PL=WDL(nA2)−WDL(nA1)

PH=WDH(nB2)−WDH(nB1)

Then the values of PL and PH obtained are applied to the discriminant diagram of FIG. 7 to determine the large-group classification. For instance, if F(PL,PH)=1, the proposed consonant period is abandoned as regarding that the dip is added to a vowel or semivowel period. As a result, such a proposed consonant period is not treated as a consonant period. The large-group classification is effected such that when F(PL, PH)=2, nasal sound group; when F(PL, PH)=3, unvoiced plosive sound group; when F(PL, PH)=4, unvoiced fricative sound group; and when F(PL, PH)=5, voiced plosive sound group.

Generally, frequency components within spectrum of voiced consonants are concentrated at low-frequency range, a large-dip is apt to occur in time series information in the high-frequency range power. On the other hand, frequency components within spectrum of unvoiced consonants are concentrated at high-frequency ragne, a larger dip is apt to occur in time series information in the low-frequency range power. In the case of unvoiced plosive sound, since it rises from no sound portion, dips appear in both low-frequency range and high-frequency range. In the case of nasal sound, although large dips do not appear in either range, since it is a voiced sound, the dip in high-frequency range power is larger. These characteristics of respective phoneme groups are used for large-group classification.

A phoneme /z/ belongs to both the voiced plosive sound group and unvoiced fricative sound group since /z/ is a phoneme having both characteristics of buzz portion and friction portion. Phonemes /r/ and /ɔ/ belong to both the voiced plosive sound group and the nasal sound since these phonemes are strongly affected by adjacent vowels so that the magnitude of power dip varies depending on appearing condition.

However, even in the case of F(PL, PH)=1, if a consonant period corresponding thereto has been subjected to segmentation as a nasal sound, then such is put in the group of nasal sounds. Similarly, in the case that segmentation is effected as unvoiced sound, then such is put in unvoiced fricative sound group.

Experiments have been made by evaluating data obtained from speech by 10 men and 10 women, each of them spoke 212 words so that approximately 4200 words are spoken in total. The result of the experiments in which large-group classification is effected, is shown in the following TABLE.

| PHONEME | NUMBER | DROPOUT | RECOGNIZED NUMBER |
|---|---|---|---|
| /p/,/t/,/k/,/c/ | 2369 | 0 | 2102 (88.7%) |
| /b/, /d/ | 721 | 5 | 628 (87.0%) |
| /m/, /n/ | 1091 | 136 | 922 (84.5%) |
| /s/, /h/ | 1410 | 19 | 1281 (90.9%) |

As shown in the TABLE, although the number of dropout of consonants in words is unnegliegibly large, the number of dropout is satisfactory when considered as a total compared to conventional results. Furthermore, recognition rate on consonant large-group classification is very high as approximately 85 % to 90 %.

From the above, it will be understood that segmentation of consonant periods and large-group classification of consonants can be readily effected by using the magnitude of dips in low-frequency range power and high-frequency range power.

A consonant small-group classification portion 16 in FIG. 9 is provided for futher classifying each of the groups into smaller groups, i.e. respective phonemes. To this end, the consonant small-group classification portion 16 comprises unvoiced plosive sound discriminating portion 17, a voiced plosive sound discriminating portion 18, a nasal sound discriminating portion 19, and a unvoiced fricative sound discriminating portion 20 which respectively correspond to the above-described large groups of phonemes.

The small-group classification of cosonants is effected by producing a series of parameters of a plurality of frames around a feature portion of an unknown phoneme of input sound which has been classified into a phoneme group, and by calculating the degree of similarity between such parameters and the aforementioned phoneme standard pattern. More specifically, a result of discrimination is obtained by detecting a phoneme of a phoneme standard pattern which has been detected to show the highest degree of similarity.

Since the feature portion of an unknown input phoneme is not known, a rising point nA2 of the low-frequency range power dip or a rising point nB2 of the high-frequency range power dip is used as a provisional feature portion, and this point is referred to as a reference frame. A proposed period of the feature portion is determined around the reference frame, where the proposed period is defined from time t1 to t2. A series of parameters of an unknown input phoneme at time t (t1≦t≦t2), is expressed in terms of Xt which is a vector of d·lth dimension wherein d is the number of parameters per one frame, and l is the number of frames. The dimensional number of Xt is the same as that of the above-mentioned phoneme standard pattern.

Now detailed way of phoneme small-group classification by using the vector Xt will be described. In the following description, it is assumed that the distance measure of Eq. (2) is used and each phoneme group comprises two phonemes (phoneme 1 and phoneme 2) for simplicity. The same idea may be applied to cases of larger number of phonemes. This method is applied to the discriminating method in all the blocks 17 to 20 of FIG. 9.

Let us assume that an average value of a standard pattern of the phoneme 1 is expressed by $\mu 1$; an average value of a standard pattern of the phoneme 2, by $\mu 2$; and an average value of a standard pattern of surrounding information, by $\mu e$. Furthermore, variance-covariance matrix which is common to all the phoneme 1, the phoneme 2 and the surrounding information is expressed in terms of $\epsilon$. This matrix is produced by averaging respective variance-covariance matrixes.

Assuming that the degree of similarity (distance) between an unkown input and the phoneme 1 is expressed in terms of L1,t, $$L1,t = (Xt - \mu 1)^T \cdot \Sigma^{-1} \cdot (Xt - \mu 1) - \qquad \text{Eq. (3)}$$
$$(Xt - \mu e)^T \cdot \Sigma^{-1} \cdot (Xt - \mu e)$$

Similarly, when expressing the degree of similarity in connection with the phoneme 2 in terms of L2,t, $$L2,t = (Xt - \mu 2)^T \cdot \Sigma^{-1} \cdot (Xt - \mu 2) - \qquad \text{Eq (4)}$$
$$(Xt - \mu e)^T \cdot \Sigma^{-1} \cdot (Xt - \mu e)$$

These equations mean that the degree of similarity to phoneme is newly produced by subtracting the degree of similarity to surrounding information from the similarity between unknown input at time t and phoneme standard pattern. Calculations of Eqs. (3) and (4) are effected during time period of t1 to t2, and then it is determined which one of L1,t and L2,t assumes a smallest value within this period so as to recognize the phoneme.

Eqs. (3) and (4) can be expanded to simple formulas as follows, where calcutlations are omitted.

$$L1,t = A\ 1 \cdot X\ t - B1 \qquad \text{Eq. (3)}'$$

$$L2,t = A\ 2 \cdot X\ t - B2 \qquad \text{Eq. (4)}'$$

In Eqs. (3)' and (4)', A 1, A 2, B1, and B2 are new standard patterns including surrounding information. The general idea of the above-mentioned method will be described with reference to FIG. 10.

Figure 10:
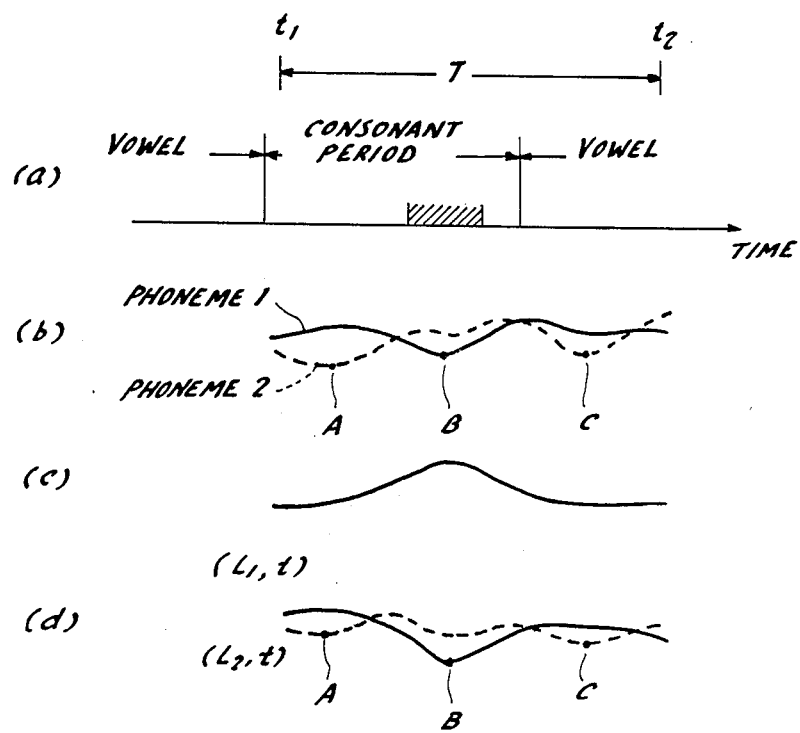
FIG. 10 is an explanatory diagram of the way of detection of feature portions and phoneme discrimination in the embodiment of the present invention.

Let us assume that determination of a consonant is to be effected with consonant period being in condition of FIG. 10 (a). It is also assumed that a proposed feature portion period T is determined as a period t1 to t2 with respect to a true feature portion, shown by way of a hatched portion. FIG. 10 (b) shows the time-dependent variation of the similarity to the phoneme 1 (solid line) and to the phoneme 2 (dotted line). References A, B and C indicate minimal value points on similarity curves. Since the degree of similarity to phoneme 1 is smaller than that to phoneme 2 at the true feature portion, i.e. point B, the consonant should be determined as the phoneme 1. Within the proposed consonant period, which has been automatically determined by way of feature parameters for segmentation, the consonant would be erroneously determined as the phoneme 2 since the similarity to the phoneme 2 is mimum at point A. FIG. 10 (c) shows a distance between the unknown input and the surrounding information standard pattern. As seen in this disatance curve of FIG. 10 (c), the value is large in the vicinity of the true feature portion. This is because that the standard pattern has been produced by using surrounding information. FIG. 10 (d) shows a distance from the phoneme standard pattern including surrounding information, and is equivalent to FIG. 10 (b) from which FIG. 10 (c) is subtracted. In the curves of FIG. 10 (d), the value at point B is smaller than the value at point A, and therefore, the consonant will be accurately determined as the phoneme 1.

In this way, according to the present invention a true feature portion can be automatically extracted from a proposed feature portion period, which has been briefly obtained by using feature parameters for segmentation, and the phoneme can be accurately determined.

In the above description, although Mahalanobis distance based on Eq. (2) has been used, other distance may also be used. For instance, in the case of Eq. (1), it can be handled in the same manner as Eq. (2) if logarithms are used. In this case, likelihood will be obtained in place of distance. Furthermore, although discrimination of a phoneme has been described in connection with a consonant, the method accorording to the present invention can also be applied to phonemes which vary as time goes, for instance, to semivowels.

In this way, the unvoiced plosive sound discriminating portion 17 effects small-group classification so as to detect /p/, /t/, /k/, /c/. Similarly, the voiced plosive sound discriminating portion 18 detects /b/, /d/, /ɔ/, /r/, /z/; the nasal sound discriminating portion 19 detecting /m/, /n/, /ɔ/, /r/; the unvoiced fricative sound discriminating portion 20 detecting /s/, /h/, /z/.

The consonant discriminating method in which large-group classification is first effected to select some phonemes out of number of phonemes and then small-group classification is effected to determine the phoneme by using satistical distance measure considering time-dependent variation around a feature point, is reasonable because it utilzes the features of consonants.

Figure 11:
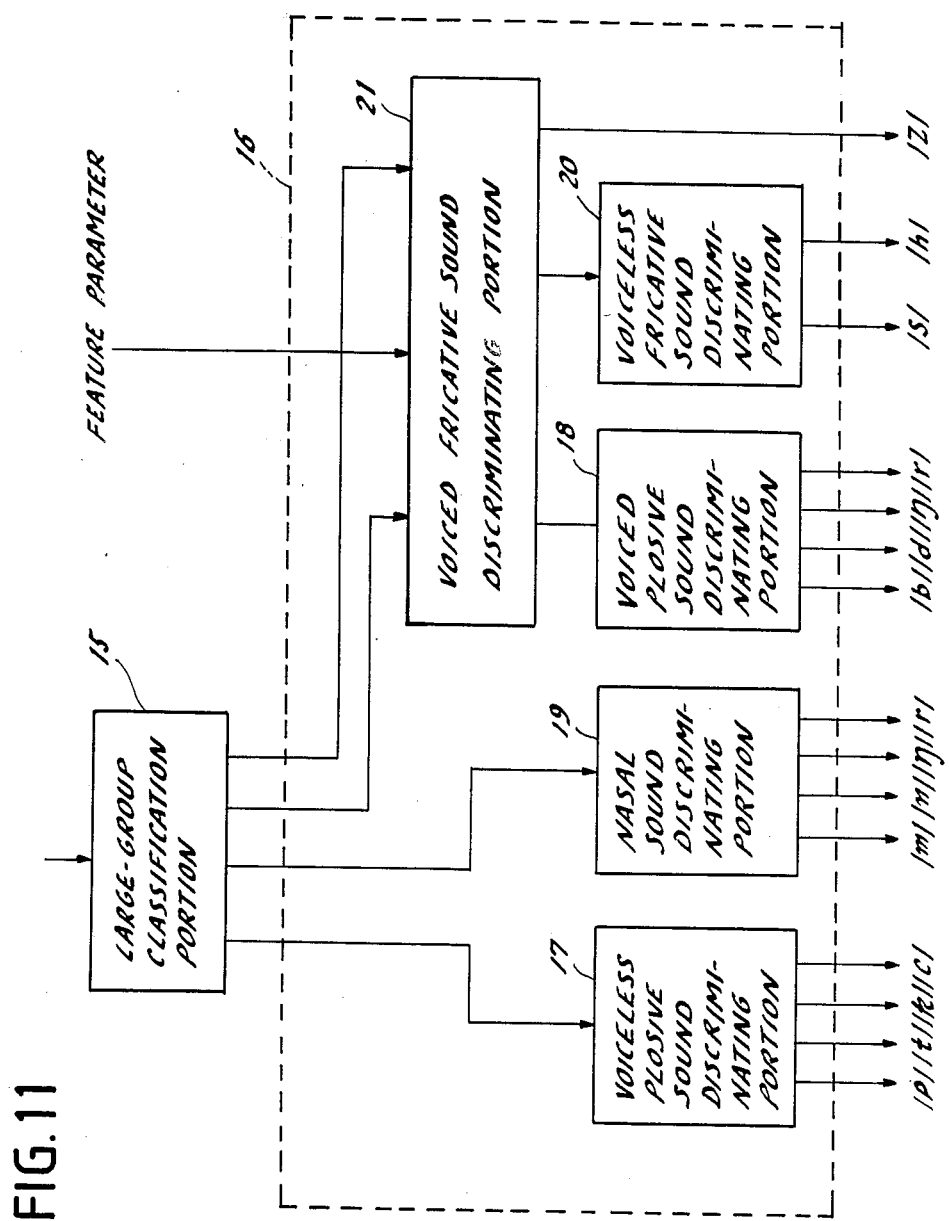
FIG. 11 is a block diagram used for the description of the way of separating voiced fricative sounds, which is used in another embodiment of the present invention.

Phonemes /z/, /r/, /ɔ/ belong to a plurality of phoneme groups, while their feature portions are sometimes different from those of other consonants. In this case, it is possible to remove these phonemes prior to effecting small-group classification. Such an embodiment is shown in FIG. 11 directed to a modification of the consonant small-group classification portion 16 of FIG. 9. In the arrangement of FIG. 11, a voiced fricative sound /z/ is separated from unvoiced fricative sound group and voiced plosive sound group.

As described hereinabove, since phoneme /z/ has a feature in the buzz portion and in the following fricative portion, it can be distinguished from voiced plosive sounds and unvoiced fricative sounds if considering time-dependent variation. In FIG. 11, only the phoneme /z/ is removed from the cosonant groups by a voiced fricative sound discriminating portion 21 responsive to the unvoiced fricative sound group and voiced plosive sound group which are both classified by the consonant large-group classification portion 15. Calculation of similarity around a reference frame is effected by using a standard pattern of /z/ considering time-dependent variation and standard pattern of other than /z/ so as to remove /z/. After /z/ has been removed, voiced plosive sound group is inputted to the voiced plosive sound discriminating portion 17, while the unvoiced fricative sound is inputted to the unvoiced fricative sound discriminating portion 20.

Figure 12:
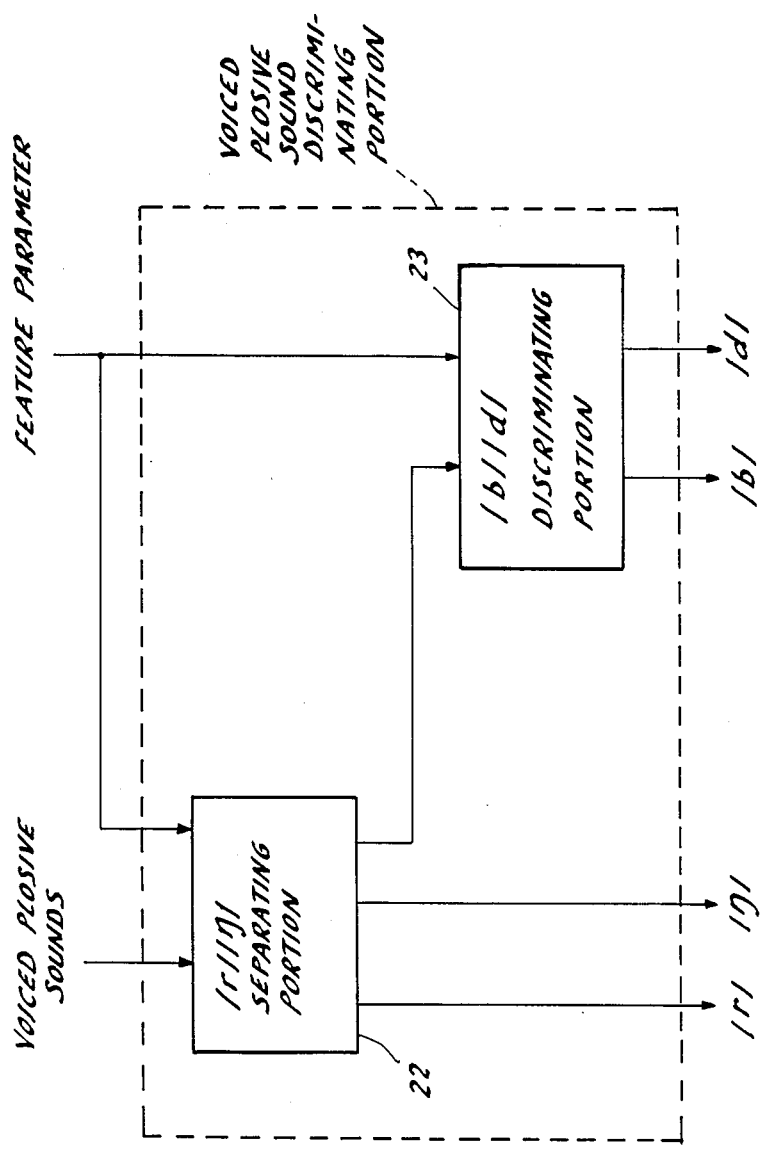
FIG. 12 is an explanatory diagram showing the way of separating "r" sound from nasal sounds in the second embodiment method according to the present invention.

FIG. 12 shows another modification which removes /r/ and /ɔ/ both included in the voiced plosive sound group, where the arrangement shows the voiced plosive sound discriminating portion 18 of FIG. 9. The feature of voiced plosive sounds /b/, /d/ is at the plosive point, whereas r/ and /ɔ/ have a feature in the variation in spectrum throughout the entire consonant period. Therefore, better results would be obtained when stepwisely separating phonemes than separating them at the same time. In FIG. 12, an /r/ and /ɔ/ separating portion 22 is arranged to separate /r/ and /ɔ/ by calculating the degree of similarity of feature parameters by using three sorts of standard patterns including the standard pattern of /r/, the standard pattern of /ɔ/ and the standard pattern of /b/ and /d/. These standard patterns are selected to have suitable frame length so that /r/ and /ɔ/ are readily separated, and calculation of similarity is effected according to the above-mentioned method around the reference frame. A /b/ and /d/ discriminating portion 23 is arranged to discriminate /b/ and /d/ by calculating the degree of similarity with respect to a suitable frame length around plosive point.

As described with reference to FIGS. 11 and 12, accurate and precise consonant classification is possible when stepwise consonant recognizing method is used, where the method is such that standard patterns (frame length and the number of parameters) suitable for the feature of a phoneme to be discriminated, are prepared, to be applied to most suitable portion with reference to the reference frame so as to calculate the degree of similarity, and this method is successively applied for effecting small-group classification.

It is to be noted that the phoneme discriminating method in which large-group classification is effected first to select some phonemes out of a number of phonemes, and then discriminating the phoneme in small-group classification by using a feature portion extracted automatically, and considering time-dependent variation, is a reasonable method which utilizes phonetical characteristics of phonemes, especially consonants and semivowels.

Figure 13A:
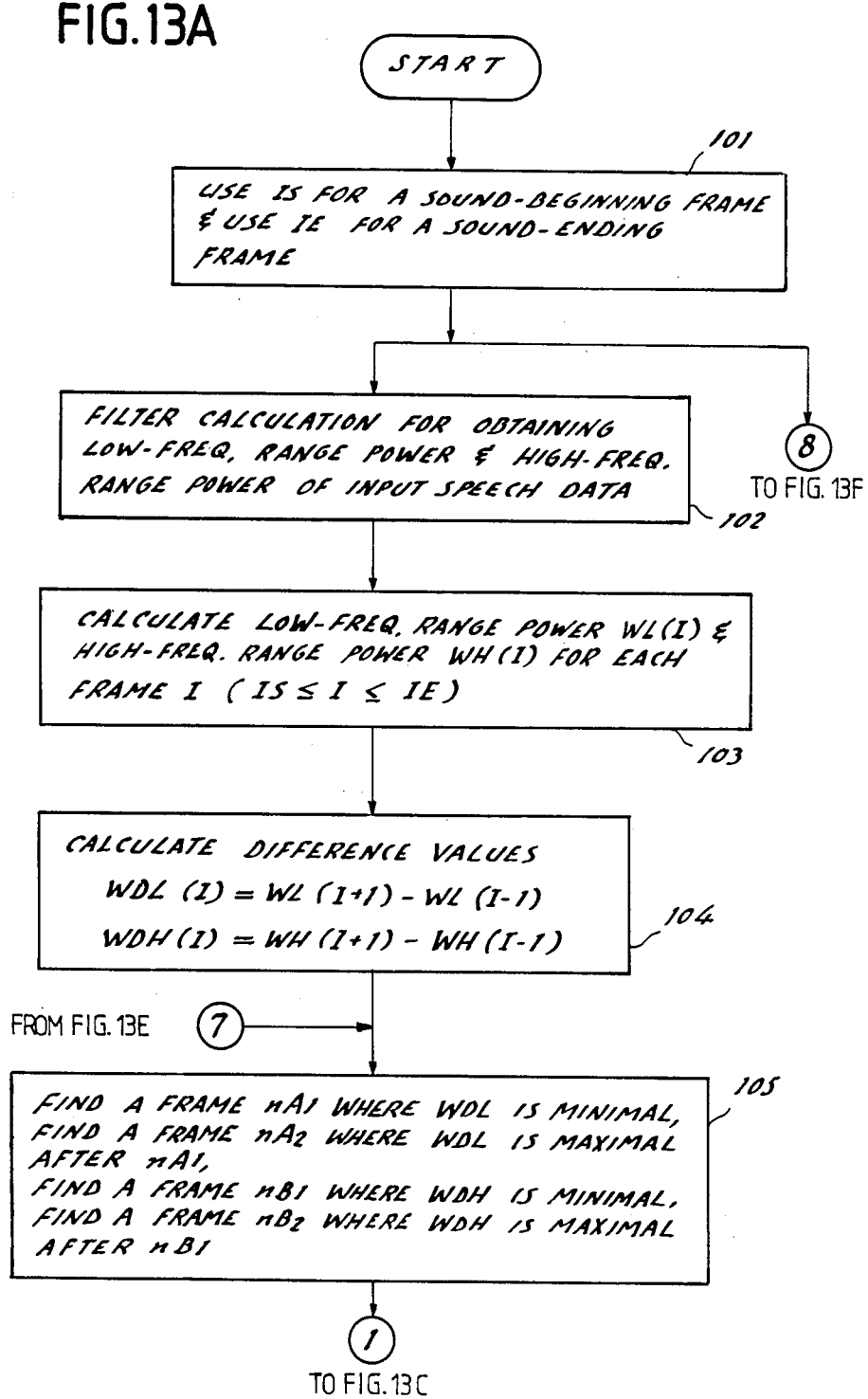
FIGS. 13A to 13G are flowcharts showing overall processing in the phoneme recognition according to the present invention.
Figure 13B:
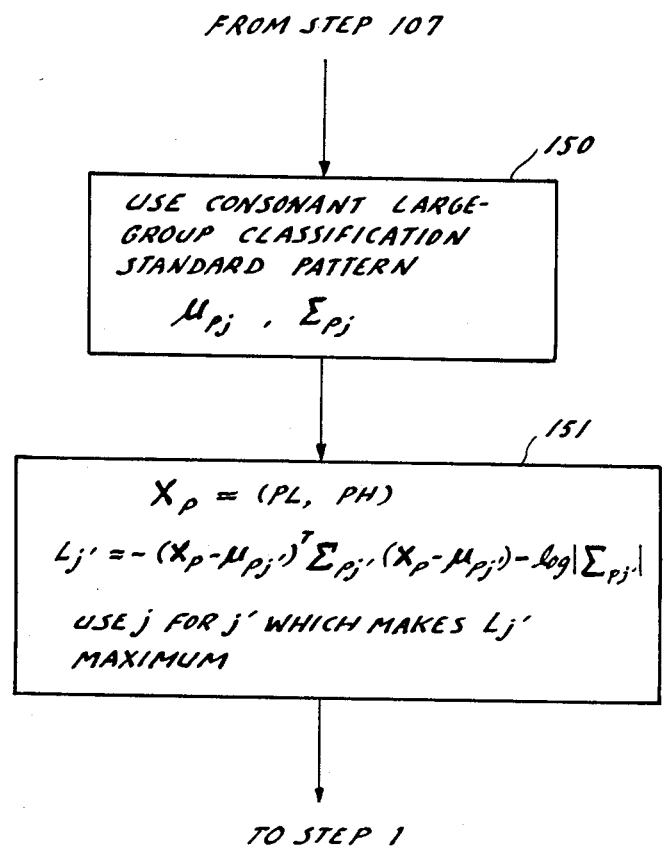
Figure 13C:
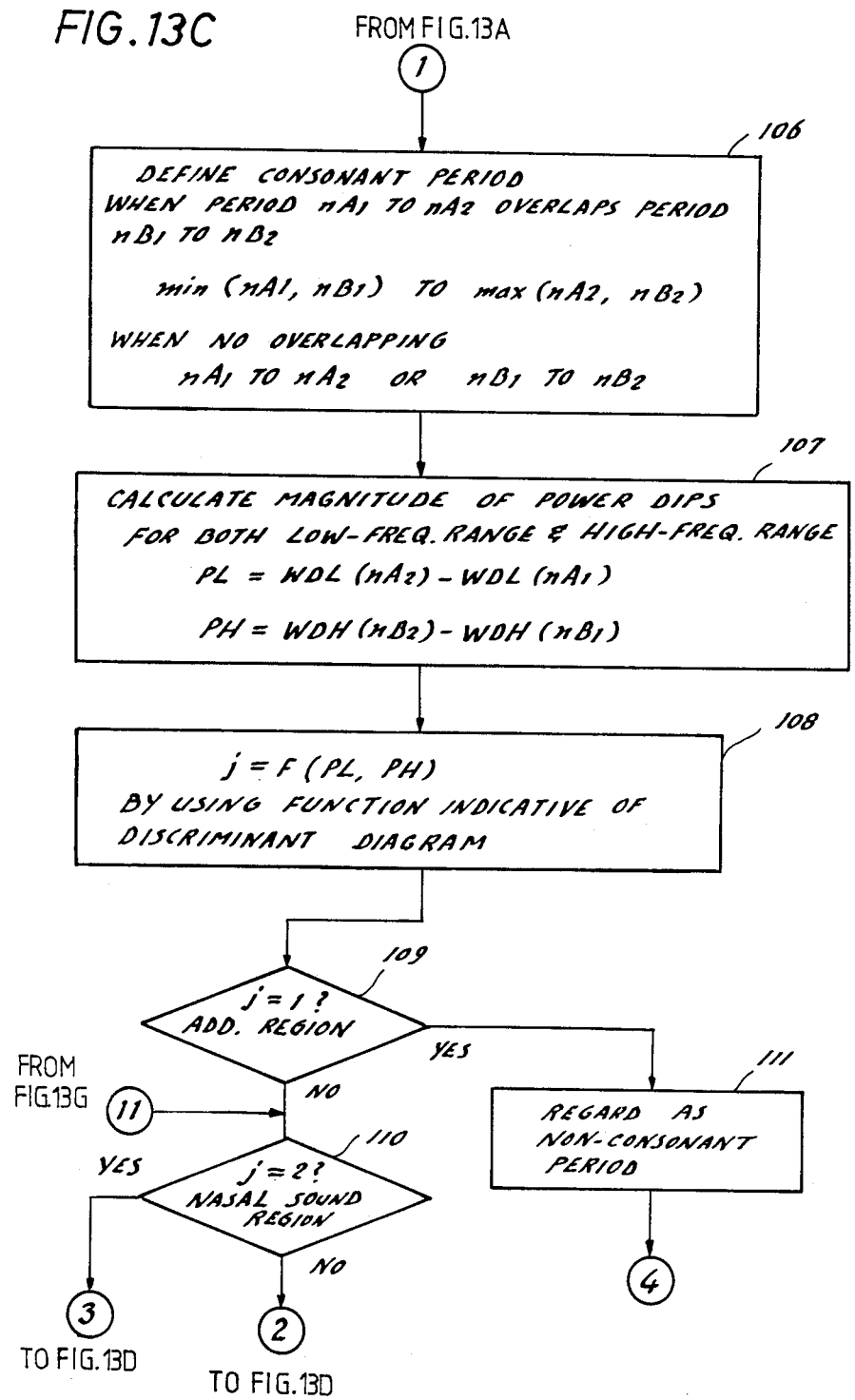
Figure 13D:
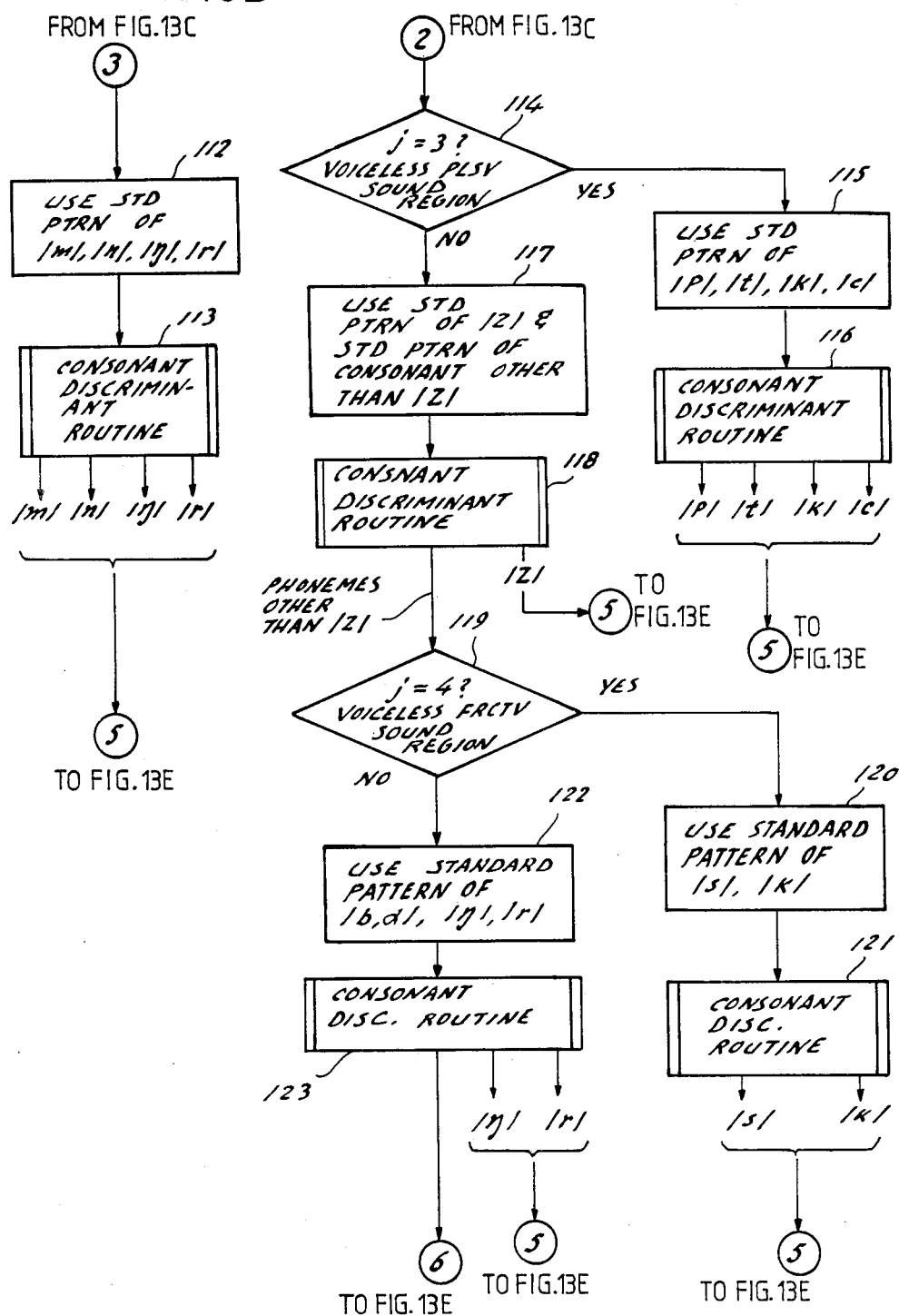
Figure 13E:
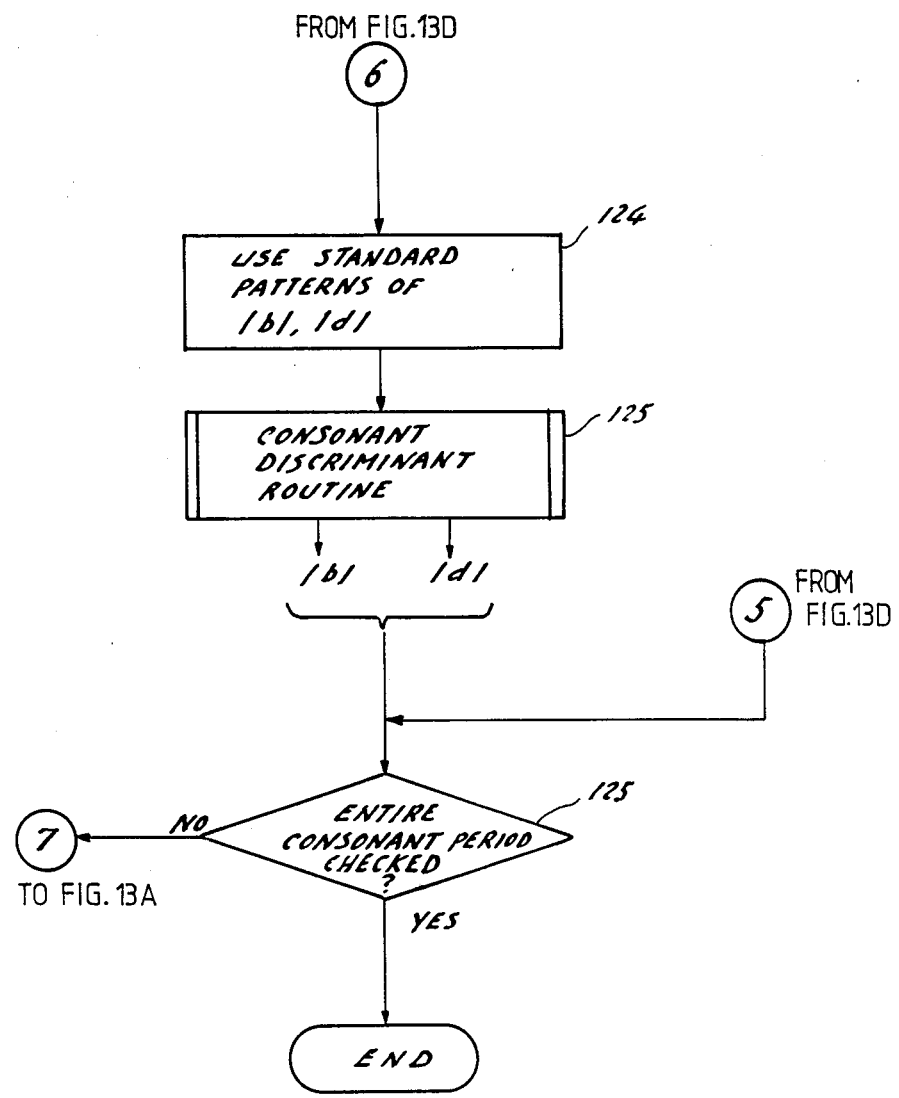
Figure 13F:
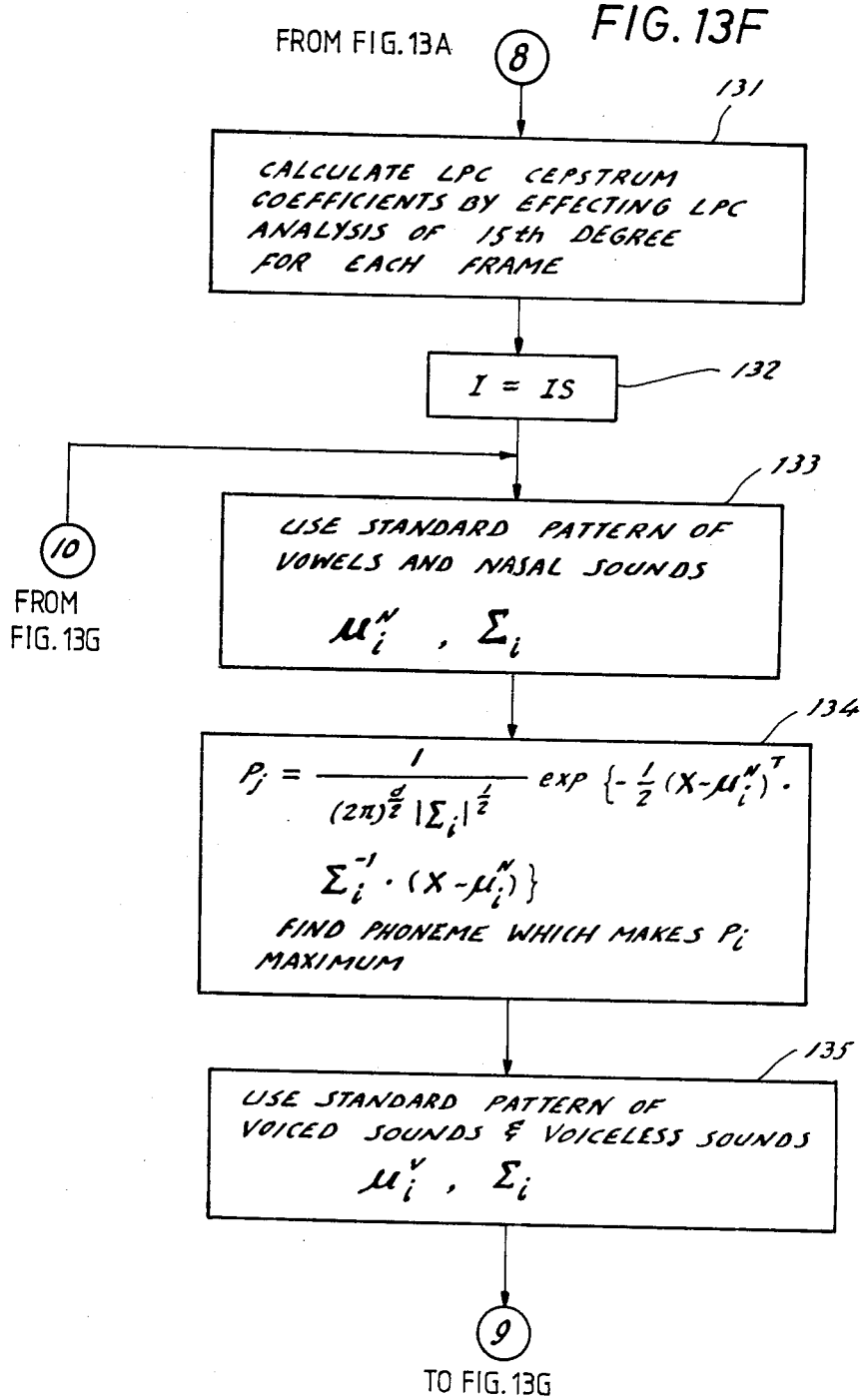
Figure 13G:
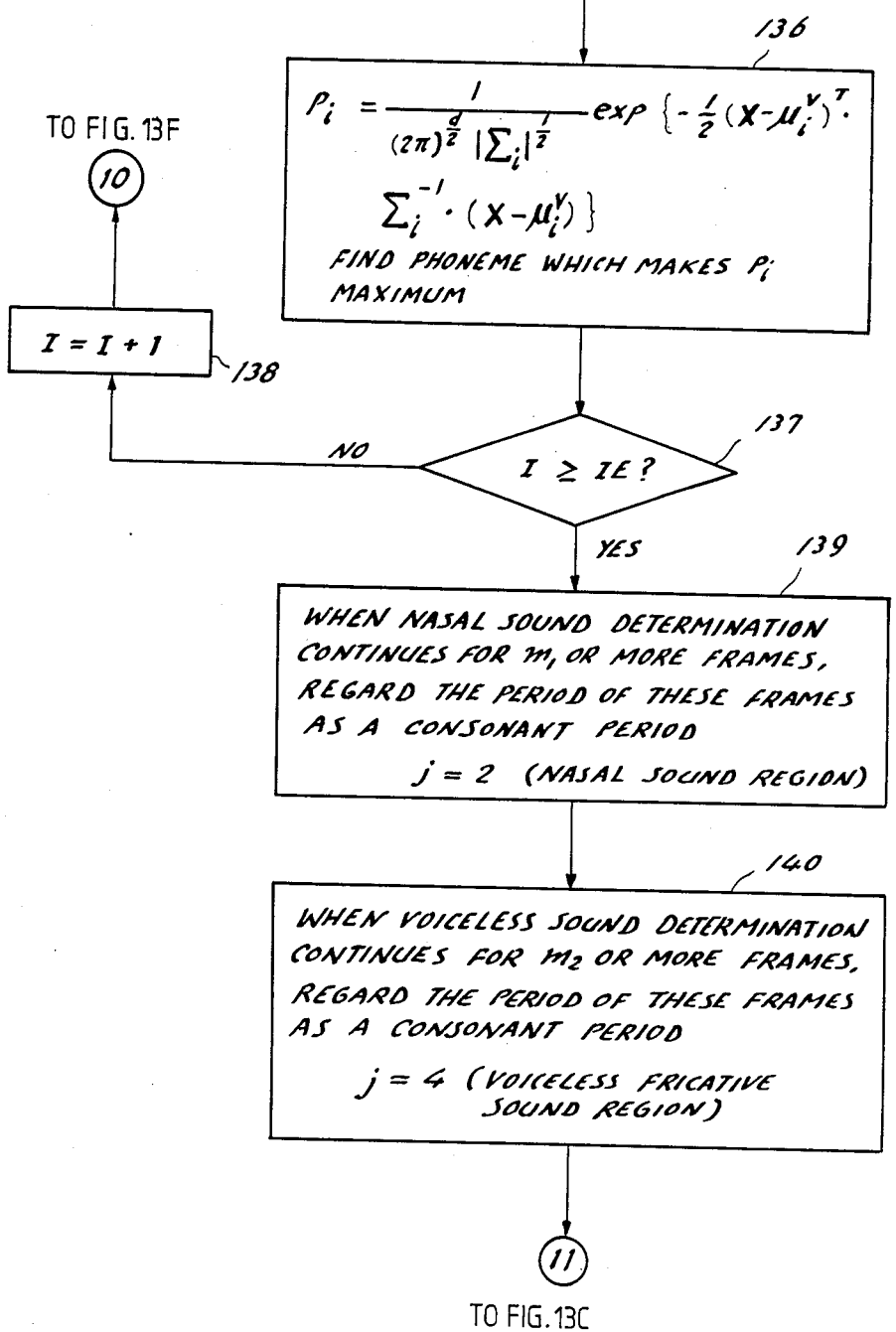
Figure 14:
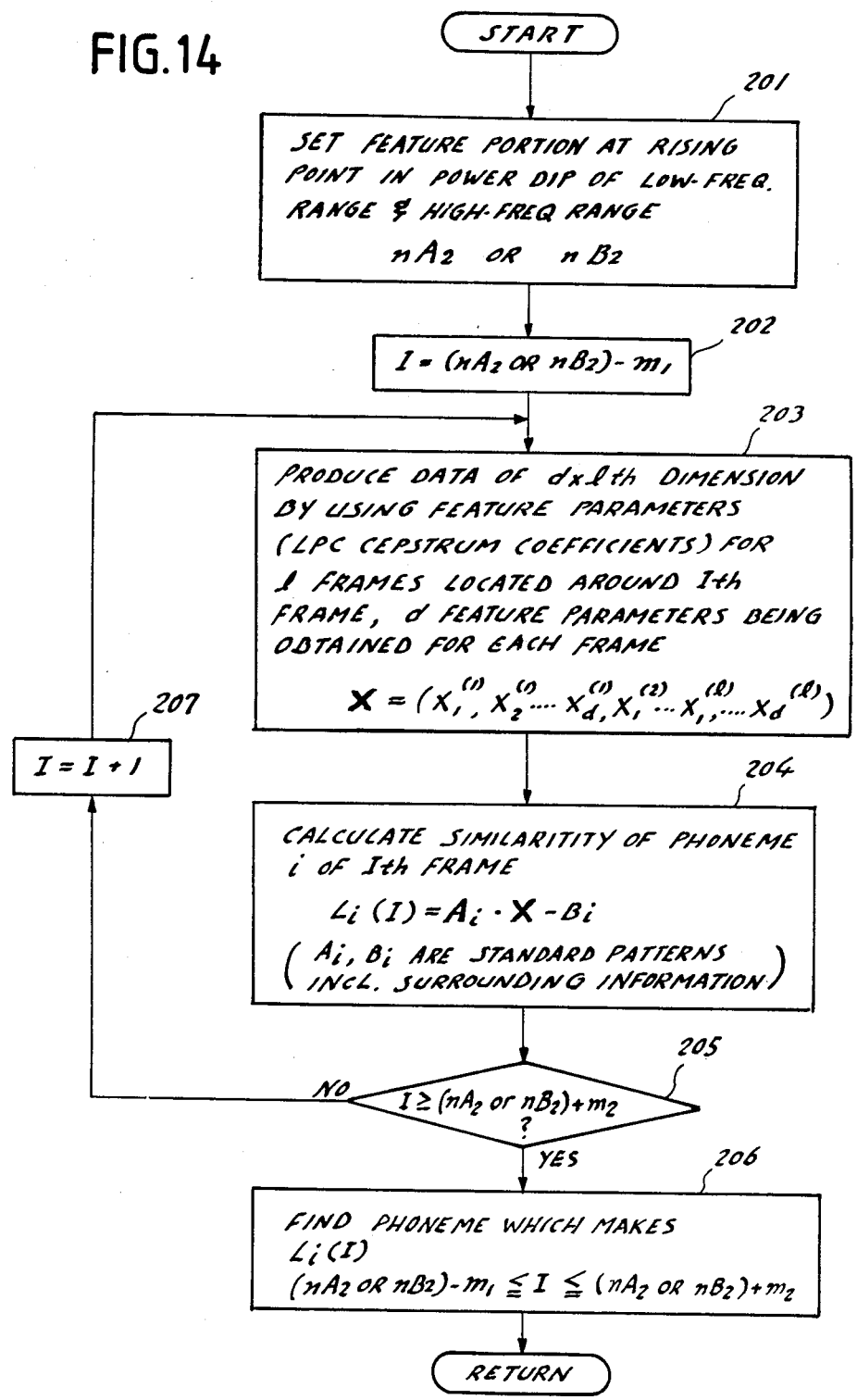
FIG. 14 is a flowchart of consonant discrimination in one embodiment of the present invention.

The above-described processings are seen in flowcharts of FIGS. 13A, 13B and 14. FIG. 13A shows a flowchart of an overall processing for phoneme recognition effected by using the above-mentioned discriminant diagram, while FIG. 13B shows a partial flow which may be used in place of some steps of the flow of FIG. 13A when the discriminant diagram is not used but consonant large-group standard patterns are used. More specifically, a step 108 of FIG. 13A may be substituted with steps 150 and 151 of FIG. 14. FIG. 14 shows a flowchart of a cosonant discriminant routine which is shown as steps 113, 116, 118, 121, 123 and 125 of FIG. 13A. Since operations and processings shown in these flowcharts of FIGS. 13A, 13B and 14 have been described in the above, redundant description thereof is omitted.

In FIG. 13A, after variables IS and IE are respectively assigned to the sound-beginning frame and to the sound-ending frame in a first step 101, a first series of steps 102 through 109, and a second series of steps 131 through 140 are respectively executed, in either parallel as illustrated or in series if desired. These two flows of the first and second series jointly flow into a step 110 so that steps 110 through 126 are executed. In the first series of steps 102 through 109, the above-described filter calculation is effected in the step 102 so as to obtain power level data in connection with low and high frequency ranges of the input speech signal, and then low-frequency range power data WL(I) and high-frequency range power data WH(I) are obtained for each frames in a following step 103. Then difference values WDL(I) and WDH(I) are obtained in a step 104. After this, a consonant period is determined and the magnitude of power dips are obtained. In the second series of steps 131 through 140, LPC analysis is performed in the step 131, and then the similarity calculation is performed in steps 132 to 136. Steps 137 and 138 are provided so that similarity calculation is performed in connection with frames starting from the sound-beginnig frame IS and ending at the sound-ending frame IE.

In a step 126, it is checked whether segmentation has been completed for the entire input sound period. If the determination in the step 126 results in NO, then the operation flow goes back to the step 105 so as to effect further segmentation.

The filter calculation executed in the step 102 may be effected by using a BUTTER WORTH FILTER of 4th degree as described in "DIGITAL SIGNAL PROCESSING" written by Alan V. Oppenheim and Ronald W. Schafer. The LPC cepstrum coefficient calculation executed in the step 131 may be carried ut as described in "LINEAR PREDICTION OF SPEECH" written by J. D. Markel and A. H. Gray.

Figure 15:
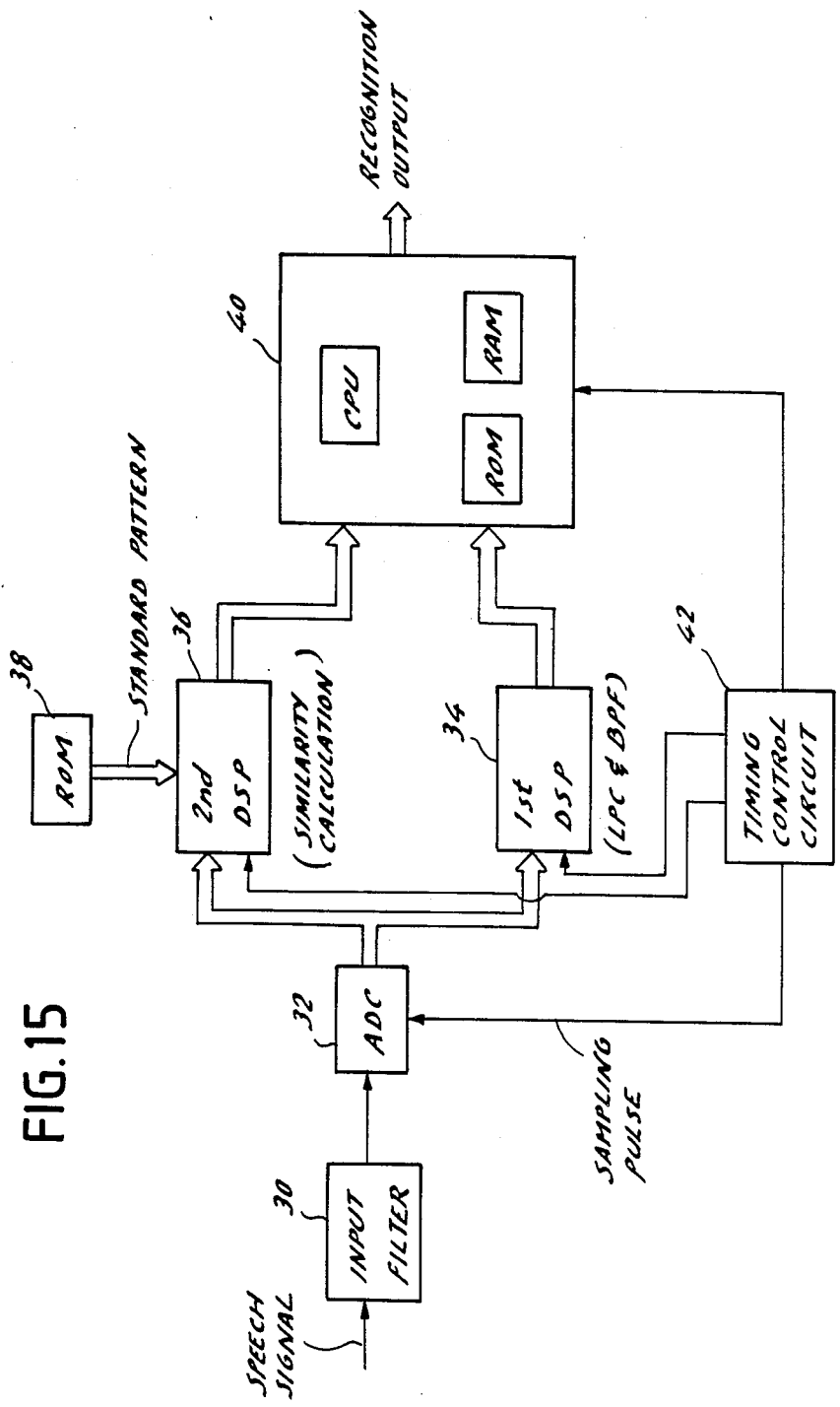
FIG. 15 is a block diagram of an embodiment of speech recognition apparatus to which the present invention is adapted.

FIG. 15 shows a circuit arrangement of the speech recognition apparatus provided for carrying out the above-described method according to the present invention. The apparatus of FIG. 15 is, therefore, provided so as to perform various operations shown in the flowcharts of FIGS. 13A, 13B and 14 as will be described in detail hereinlater. The apparatus comprises an input filter 30, an analog-to-digital (A/D) converter 32, a first digital signal processor 34, a second digital signal processor 36, an read-only memrory (ROM) 38, a microcomputer 40 and a timing control circuit 42. An input audio signal including a speech sound signal is applied to the input filter 30 for removing unnecessary frequency components, and then a filtered signal is fed to the A/D converter 32 to be converted into digital data. Digital data outputted from the A/D converter 32 is fed to the first digital signal processor which is provided for LPC (Linear Predictive Coding) operation and band-pass filtering. Furthermore, the digital data from the AD converter 32 is fed to the second digital signal processor 36 to which standard pattern data stored in the ROM 38 is also applied, so that the degree of similarity between the input speech data, i.e. low-frequency range power data and high-frequency range power data, and the similarity to the phoneme standard pattern is calculated. Output data from the first and second digital signal processors 34 and 36 are then respectively fed to the microcomputer 40 for the recognition of phonemes. The microcomputer 40 comprises a central processing unit (CPU), a read-only memory (ROM), a random-access memory (RAM) and unshown peripheral units, such as an input/output device and busses. The timing control circuit 42 comprises a clock pulse generator and frequency dividers responsive to clock signal from the clock pulse generator for producing various timing or control signals fed to the A/D converter 32 as a sampling signal, to the first and second digital signal processors 34 and 36 as control signals, and to the microcomputer 40 as a synchronous signal. The microcomputer 40 operates in accordance with the flowcharts of FIGS. 13A, 13B and 14 for discriminating phonemes and therefore recognizes spoken words.

More specifically, among various steps of FIGS. 13A, steps 102, 103 and 131 are executed by the first digital signal processor 34, while steps 133, 134, 135 and 136 are executed by the second digital signal processor 36, so that remaining steps in FIGS. 13A, 13B and 14 are all executed by the microcomputer 40. The result of recognition is thus outputted from the microcomputer 40 as digital data.

In the description of FIG. 9, although it has been mentioned that segmentation is first effected so as to detect a reference frame, and then calculation of similarity is effected, in actual devices, similarity calculation is effected centering each of all frames within the consonant period with frames being shifted one by one, so that segmentation is also effected in parallel for obtaining a reference frame, and the phoneme is recognized with reference to similarity in connection with the reference frame, where there is no substantial difference between the method of FIG. 9 and the actual arrangement.

According to the embodiment an average recognition ratio of approximately 76.1% is obtained with respect to consonants ( /p/, /t/, /k/, /c/, /b/, /d/, /n/, /m/, /ɔ/, /r/, /z/, /s/, /h/) of all spoken words. The ratio is resulted from data of 212 words spoken by 20 persons including males and females, and therefore the data is of high reliability. When evaluating conventional method under the same condition, an average recognition ratio with respect to cosonants (/r/, / /, /h/, /s/, /c/) and consonant groups (unvoiced plosive sound group, voiced plosive sound group, nasal sound group), is approximately 72.5 %.

It will be understood that the present invention is advantageous when considering that small-group classification is not effected in some consonant groups according to the conventional method.

The above-described embodiments are just examples of the present invention, and therefore, it will be apparent for those skilled in the art that many modifications and variations may be made without departing from the spirit of the present invention.

What is claimed is:

1. A method of recognizing speech, comprising the steps of:
   (a) obtaining low-frequency range power and high-frequency range power of an audio spectrum of an input audio signal corresponding to said speech;
   (b) obtaining first derivatives with respect to time of said low-frequency range power and high-frequency range power respectively;
   (c) obtaining min-max differences from respective ones of said first-derivatives; and
   (d) effecting segmentation and classification of consonants simultaneously by using said min-max differences.

2. A method as claimed in claim 1, wherein said classification is effected for classifying a consonant into one of predetermined phoneme groups by comparing parameters which correspond to said min-max differences, with consonant large-group classification standard pattern, which is prepared in advance, by using a statistical distance measure.

3. A method as claimed in claim 1, wherein a discriminant diagram indicative of two-dimensional distribution of said min-max differences is prepared, and then said min-max differences are applied to said discriminant diagram so as to classify each consonant into one of phoneme groups.

4. A method as claimed in claim 1, wherein said min-max difference of said low-frequency range power is a distance between negative and positive maximal values in time-dependent variation of a difference value of said low-frequency range power, and said min-max difference of said high-frequency range power is a distance between negative and positive maximal values in time-dependent variation of a difference value of said high-frequency range power.

5. A method as claimed in claim 2, wherein said statistical distance measure is one of a distance based on Bayes discriminant, Mahalanobis distance and a linear discriminant function.

6. A method of recognizing speech, comprising the steps of:
  (a) obtaining low-frequency range power and high-frequency range power of an audio spectrum of an input audio signal corresponding to said speech;
  (b) obtaining first derivatives with respect to time of said low-frequency range power and high-frequency range power respectively;
  (c) obtaining min-max differences in said first-derivatives respectively; and
  (d) effecting large-group classification of consonants by using said min-max differences so as to classify consonants into a plurality of phoneme groups;
  (e) extracting a feature parameter of a phoneme by regarding a rising point of said dip as a reference point;
  (f) calculating the degree of similarity between said feature parameter and standard patterns by using a statistical distance measure; and
  (g) effecting small-group classification so as to discriminate a phoneme.

7. Apparatus for speech recognition, comprising:
  (a) a filter analysis and power calculation portion responsive to input audio signal for effecting frequency analysis and calculation of power for each frame;
  (b) an LPC analyzing portion responsive to said input audio signal for effecting linear predictive analysis for each frame;
  (c) a feature parameter extracting portion responsive to results from said LPC analyzing portion for calculating feature parameters;
  (d) a vowel and voiced or unvoiced sound discriminating portion which effects discrimination of a vowel and voice or unvoiced sound by calculating the degree of similarity between said feature parameter and standard patterns prepared in advance, by using a statistical distance measure;
  (e) a consonant detecting portion for effecting segmentation of consonants by detecting min-max differences in first derivatives of outputted from said filter analysis and power calculation portion;
  (f) a consonant large-group classification portion for classifying portions which have been recognized as consonants through said segmentation, into a plurality of consonant groups on the basis of said min-max differences; and
  (g) a consonant small-group classification portion for classifying consonants of each of said consonant groups into respectively phonemes.

8. Apparatus as claimed in claim 7, wherein said feature parameter is one of LPC cepstrum coefficients, spectrum information from a filter bank, and PARCOR coefficients resulted from LPC analysis.

9. Apparatus as claimed in claim 7, wherein said statistical distance measure is one of a distance based on Bayes' discriminant, Mahalanobis, distance and a linear discriminant function.

10. A method of recognizing speech, comprising the steps of:
  (a) obtaining low-frequency range power and high-frequency range power of an audio spectrum of an input audio signal corresponding to said speech for each frame;
  (b) obtaining first derivatives with respect to time of said low-frequency range power and high-frequency range power respectively;
  (c) obtaining min-max differences in said first-derivatives respectively; and
  (d) effecting large-group classification of consonants by using said min-max differences for classifying consonants into a plurality of phoneme groups;
  (e) setting a feature portion, which is useful for discriminating a phoneme, including a reference frame and time-dependent variation of the phoneme; and
  (f) calculating the degree of similarity based on a statistical distance measure between time series information of a feature parameter extracted from said input audio signal and phoneme standard patterns of respective phonemes which belong to said classified phoneme group for discriminating the phoneme.

11. A method as claimed in claim 10, wherein said time series information of said feature parameter is a parameter series of d·lth dimension wherein l is the number of frame of said feature portion and d is the number of feature parameters.

12. A method as claimed in claim 10, further comprising the steps of:
  (a) determining a proposed period including said feature portion;
  (b) applying said phoneme standard pattern and a surrounding information standard pattern, which is prepared in advance in addition to said phoneme standard pattern, to the entire range of said proposed period with said frames being shifted one by one, for obtaining the degree of similarity to respective phonemes under a condition in which influence by a portion around the feature portion is removed; and
  (c) discriminating the phoneme by the comparison of said degree of similarity of the phoneme at said proposed period.

13. A method as claimed in claim 12, wherein said surrounding information standard pattern is produced by the steps of:
  (a) setting a surrounding information period, which is sufficiently longer so as to include said feature portion, for each of said phoneme groups;
  (b) obtaining a parameter series of d·lth dimension by dividing said surrounding information by l frames wherein l is a positive integer and l is the number of feature parameters per one frame, with the frames being shifted one by one; and
  (c) repeating said step (b) for respective phonemes.

14. A method as claimed in claim 10, wherein said phoneme groups includes a group of unvoiced plosive sounds, a group of voiced plosive sounds, a group of nasal sounds, and a group of unvoiced fricative sounds.

15. A method as claimed in claim 10, wherein phoneme groups are first classified into a group of unvoiced plosive sounds, a group of voiced plosive sounds, a group of nasal sounds, and a group of unvoiced fricative sounds, and then voiced fricative sounds are recognized in each of said group of voiced plosive sounds and said group of unvoiced fricative sounds.

16. A method as claimed in claim 10, wherein phonemes /r/ and /ɔ/ are separated by calculating the degree of similarity to feature parameter by way of three sorts of phoneme standard patterns including a phoneme standard pattern of a phoneme /r/, a phoneme standard pattern of a phoneme /ɔ/, and a phoneme /b/ and /d/ are discriminated by calculating the degree of similarity in connection with an appropriate number of frames around a plosive point.

17. A method as claimed in claim 10, wherein said feature parameter is one of LPC cepstrum coefficients, spectrum information from a filter bank, and PARCOR coefficients resulted from LPC analysis.

18. A method as claimed in claim 10, wherein said statistical distance measure is one of a distance based on Bayes discriminant, Mahalanobis distance and a linear discriminant function.

* * * * *